(12) United States Patent
Matsui

(10) Patent No.: US 6,320,635 B1
(45) Date of Patent: Nov. 20, 2001

(54) LIQUID CRYSTAL ELEMENT AND MANUFACTURE THEREOF

(75) Inventor: Eriko Matsui, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/245,374

(22) Filed: Feb. 5, 1999

(30) Foreign Application Priority Data

Feb. 6, 1998 (JP) .................................................. 10-025644

(51) Int. Cl.[7] ........................... G02F 1/141; G02F 1/1337
(52) U.S. Cl. ........................... 349/133; 349/124; 349/135; 428/1.2
(58) Field of Search ..................................... 349/133, 134, 349/135, 124, 125, 129, 172, 187; 428/1.2, 1.21, 1.23

(56) References Cited

U.S. PATENT DOCUMENTS 4,902,106 * 2/1990 Dijon et al. ........................... 349/172
5,654,784 * 8/1997 Yasuda et al. ........................ 349/133

* cited by examiner

Primary Examiner—Minh-Toan T. Ton
Assistant Examiner—Tai V. Duong
(74) Attorney, Agent, or Firm—Ronald P. Kananen; Rader, Fishman & Grauer

(57) ABSTRACT

Disclosed is a liquid crystal element capable of reducing the threshold voltage value, temperature-dependence on light transmittance, and hysteresis phenomenon. The liquid crystal element basically includes a pair of substrates each having a liquid crystal orientation film, wherein the surface sides, on which the liquid crystal orientation films are formed, of the substrates are opposed to each other with a specific gap put therebetween and a liquid crystal is arranged in the gap. The liquid crystal orientation film includes: a $SiO_x$ obliquely vapor-deposited film ($_x$: positive number less than 2); and a polyvinyl alcohol based thin film stacked on the obliquely vapor-deposited film to a thickness of 0.1 μm or less (the concentration of the polyvinyl alcohol based water solution is 1 wt % or less) allowed to keep irregularities of oblique pillars of the obliquely vapor-deposited film. Accordingly, it is possible to sufficiently exhibit the orientation of a liquid crystal due to the shapes of the $SiO_x$ pillars and obtain the compatibility between polyvinyl alcohol and the liquid crystal material (that is, reduction in anchoring force, and suppression in polarization and interaction between the liquid crystal and $SiO_x$).

8 Claims, 18 Drawing Sheets

DISPLAY ELECTRODE

DISPLAY ELECTRODE

TEMPERATURE-DEPENDENCE ON THRESHOLD
VOLTAGE VALUE IN PVA STACKED FILM

PVA CONCENTRATION-DEPENDENCE ON THRESHOLD VOLTAGE VALUE IN PVA STACKED FILM

RELATIONSHIP BETWEEN APPLIED ELECTRIC FIELD AND τ(0-0%)

TEMPERATURE-DEPENDENCE ON $\tau(0-0\%)$ IN PVA STACKED FILM

TEMPERATURE-DEPENDENCE ON ROTATIONAL VISCOSITY IN PVA STACKED FILM

F I G. 14
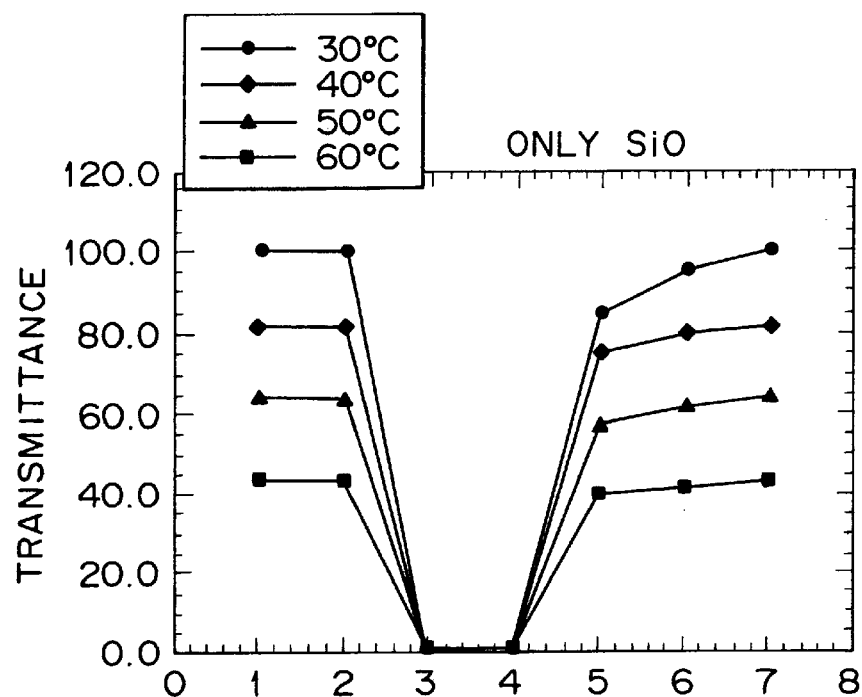
F I G. 15
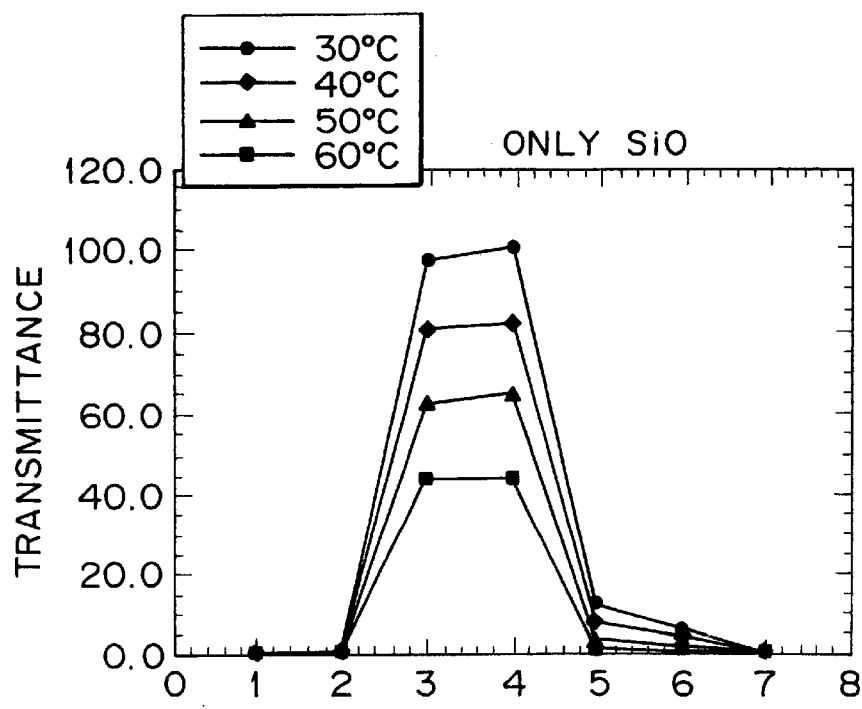

F I G. 16
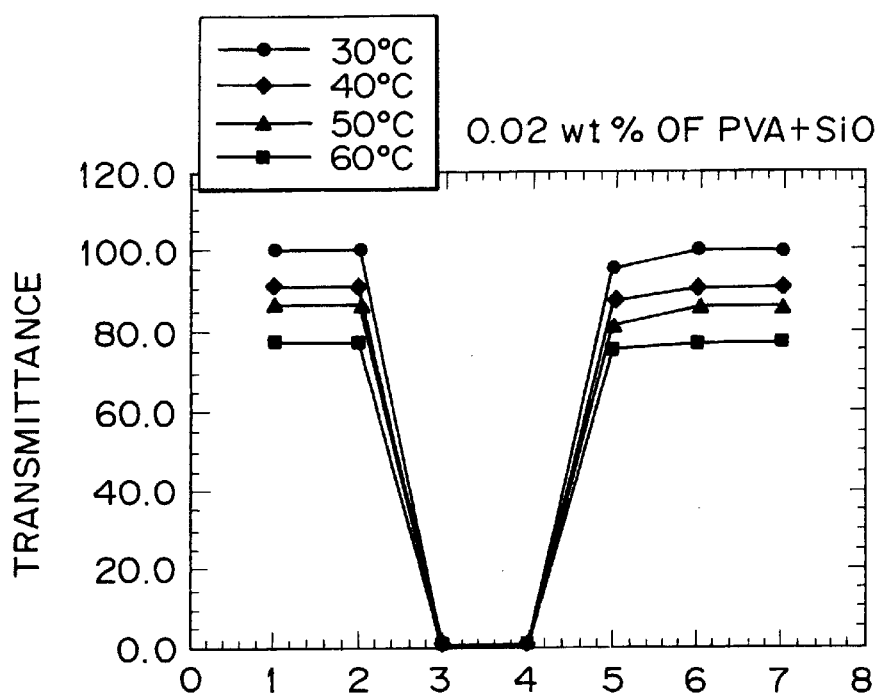
F I G. 17
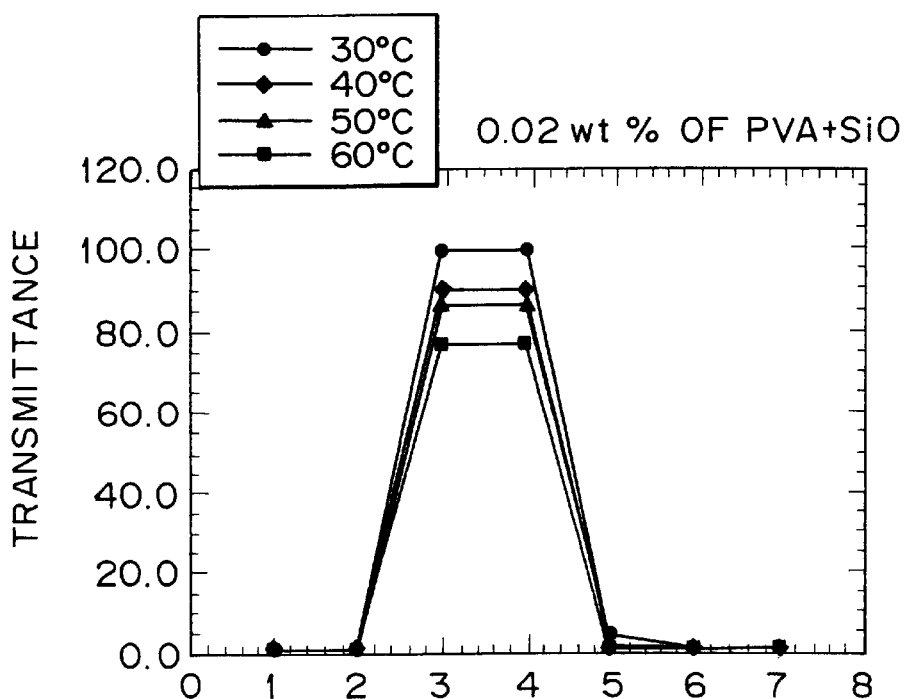

TEMPERATURE - DEPENDENCE ON THRESHOLD
VOLTAGE VALUE IN NYLON STACKED FILM

MODEL OF FERROELECTRIC LIQUID CRYSTAL

CHARACTERISTIC OF THRESHOLD VOLTAGE VALUE OF FERROELECTRIC LIQUID CRYSTAL

LIQUID CRYSTAL ELEMENT AND MANUFACTURE THEREOF

BACKGROUND OF THE INVENTION

The present invention relates to a liquid crystal element (for example, a liquid crystal display element or liquid crystal display) including a plurality of bases each having a liquid crystal orientation film, wherein the surface sides, on which the liquid crystal orientation films are formed, of the adjacent two pieces of the bases are opposed to each other with a specific gap put therebetween and a liquid crystal is arranged in the gap, and to a method of manufacturing the liquid crystal element.

A liquid crystal display (LCD) using a liquid crystal as a display means has advantages in low power consumption, thin structure, and light weight. Such a liquid crystal display having the above advantages has come to be applied to a watch, electronic calculator, computer display, and television (TV) set.

Studies have been actively made to employ a ferroelectric liquid crystal (FLC) as the liquid crystal used for LCDs. The FLC was synthesized by R. B. Meyer in 1975 and a surface stabilized ferroelectric liquid crystal enabling domain inversion by an applied electric field was invented by N. A, Clark and S. T. Lagerwall in 1980. The FLC, whose molecules have permanent dipole moments in the directions perpendicular to major axes of the molecules, exhibits spontaneous polarization, and therefore, it is switchable by an applied electric field. A FLC display using the FLC mainly has the following excellent features (1) to (3):

(1) The switching speed is in the order of $\mu$s which is as high as about 1,000 times that of a TN (Twisted Nematic) liquid crystal display. That is to say, the FLC display is excellent in high-speed responsiveness.

(2) The molecule array has basically no twisted structure. That is to say, the FLC display has less viewing angle-dependence.

(3) Even if a power supply is turned off, an image is held. That is to say, the FLC display has a feature of storing an image, so that it enables simple matrix drive even for 1,000 or more scanning lines capable of meeting the requirement of high precision display.

Accordingly, the FLC display is expected to realize performances such as higher precision, lower cost, and larger screen.

With respect to the ferroelectric liquid crystal element (for example, surface stabilized ferroelectric liquid crystal element), as shown in FIG. 25, the orientation of liquid crystal molecules M is switched between states 1 and 2 when an external electric field E (Ps: spontaneous polarization) is applied to the liquid crystal element. When the liquid crystal element is arranged between crossed-sheet polarizers, a change in orientation of liquid crystal molecules is converted into a change in light transmittance. To be more specific, as shown in FIG. 26, the transmittance is rapidly changed from 0% to 100% at a threshold voltage $V_{th}$.

Since the ferroelectric liquid crystal display using a bistable mode exhibits only two stable states as described above, it is difficult to realize gradation display by controlling an applied voltage like the TN liquid crystal display.

To be more specific, the ferroelectric liquid crystal display element is difficult to realize gradation display by controlling an applied voltage because the transmission light is modulated such that the quantity of transmission light is rapidly changed. To cope with such an inconvenience, there has been proposed a method (area gradation method) of realizing gradation display by adjusting an image with the aid of additionally provided sub-pixels. The method, however, is disadvantageous in that since the gradation display is not performed in one pixel, it becomes insufficient or raises the cost if the size of one pixel is very small, for example, in the case where the liquid crystal element is used as a light modulation element.

To solve such a problem, there has been invented a technique of realizing digital gradation display while keeping a high contrast in the case of using a spatial light modulation element of a so-called ON-OFF type in which either of two states (transmission or non-transmission of light, or reflection or non-reflection of light) is selected, like the ferroelectric liquid crystal display element.

To be more specific, the above-described display technique is intended to display, in principal, gradations capable of producing an illusion of a continuous image for viewers by combining a field sequential method using a spatial light modulation element for selecting either of two states (transmission or non-transmission of light, or reflection or non-reflection of light) with modulation of the intensity of light supplied from a light source. This technique has been disclosed by the present applicant (Japanese Patent Laid-open Nos. Hei 5-347576 and Hei 7-212686).

For a reflection type light modulation element using a ferroelectric liquid crystal, a reflection layer allowing light supplied from a light source to be reflected therefrom, a ferroelectric liquid crystal layer for effecting light modulation, and a counter electrode for driving a ferroelectric liquid crystal are provided on a drive layer.

In the case of using a light source having one kind of light intensity, to display eight bits (256 levels) of gradations, the time (16.7 ms) for one frame must be simply time-divided into parts equivalent to eight bits (256 levels), that is, 0 to 255 steps, and accordingly, the ferroelectric liquid crystal must be perfectly driven at about 65.5 $\mu$s/line. To display ten bits of gradations, the ferroelectric liquid crystal must be perfectly driven at about 16.3 $\mu$s/line. From the viewpoint of the response speed of the present ferroelectric liquid crystal, it is difficult to realize the above drive speed. In other words, to realize the above drive speed, an applied electric field must be set at a high value.

The drive speed of the ferroelectric liquid crystal, however, can be made significantly larger by use of a light source capable of modulating the light intensity. If the light source is capable of modulating the light intensity in steps equivalent to eight bits (or ten bits) as shown in FIG. 27, the ferroelectric liquid crystal may be driven at about 2.08 ms/line (or 1.67 ms/line) for displaying eight bits (or ten bits) of gradations. Such a drive speed of the ferroelectric liquid crystal can be practically realized from the viewpoint of the response speed of the ferroelectric liquid crystal. Here, an image composed of one gradation bit is referred to as "bit plane", and the display time thereof is referred to as "bit plane time". For example, as shown in FIG. 27, if eight bits of gradations are displayed, the number of bit planes is eight and the sum of the eight bit planes constitutes one frame.

Recently, with advance of a digital display element typically in the field of plasma display panel, it is required to realize a high quality image. It has been reported that eight to ten bits of gradations are sufficient for digital gradation display but are insufficient for realizing a high quality image.

This is because eight to ten bits of gradations ensure sufficiently high image quality upon display of a static image but cause a problem associated with a pseudo contour upon display of a dynamic image.

The pseudo contour results from the fact that the divided bit plane display time becomes longer upon field sequential (time-division) drive. When the eyes of a viewer follows a light emission point, the retinas of the eyes receive an improper stimulus because a time deviation of the light emission pattern is converted into a spatial deviation thereof. This phenomenon is the pseudo contour. It has been already proposed by the present inventor to improve the pseudo contour by applying the bit plane division method to a light modulator using a ferroelectric liquid crystal (Japanese Patent Laid-open No. Hei 7-212686).

In this case, the problem associated with the pseudo contour can be solved by making infinitely shorter the bit plane time; however, from the viewpoint of the device structure, power consumption, and data transfer rate to a light bulb, it may be desirable to set one bit plane time at 100 μs or more. Also, in terms of the response time of a ferroelectric liquid crystal and the drive voltage utilizing an active element, the time until completion of the switching of the liquid crystal may be set at 50 μs and the one frame may be set at 36 bit planes×three primary colors.

It may be of course desirable to make the drive voltage of a liquid crystal as small as possible. The reduction in drive voltage is effective to omit a high withstand voltage transistor of a silicon VLSI circuit can be omitted. In consideration of the technical level of the present VLSI, it is required to set the drive voltage of the liquid crystal at 3 V or less.

The liquid crystal material requires various improvements, for example, extension of the usable temperature range in addition to the reduction in threshold voltage value associated with the above-described reduced drive voltage, and it may be considered that the reduction in threshold voltage value cannot be sufficiently achieved only by improving the liquid crystal material.

Since the gradation is controlled only using two values (white and black), the stability of transmittance becomes important. In particular, the temperature of the liquid crystal during display, which is changed depending on the environmental temperature in an operational room or the heat generation of a drive circuit, exerts an effect on transmittance, and consequently, it is essential to reduce the temperature-dependence on transmittance.

Further, it has been recognized that a ferroelectric liquid crystal light bulb exhibits a hysteresis phenomenon. To be more specific, not only the white or black having been displayed at the last bit plane but also the white or black having been displayed at the bit plane preceding the present one by several tens of bits, exerts an effect on the display of the present bit plane. Concretely, even if the display at the last bit plane is black, the color of the present bit plane is not determined into white or black because it is affected by the display color (white or black) at the bit plane before the last one. Such a phenomenon significantly appears in the ferroelectric liquid crystal having a larger difference between the full cone angle and memory cone angle.

SUMMARY OF THE INVENTION

An object of the present invention is to provide a liquid crystal element capable of reducing the threshold voltage value, temperature-dependence on transmittance and hysteresis phenomenon using the same liquid crystal material, and to provide a method of manufacturing the liquid crystal element.

The present inventor has estimated that the compatibility between a liquid crystal material and an orientation film causes the above-described problems, and that the problems can be solved by surface reforming of the orientation film, and eventually the present inventor has accomplished the present invention.

According to a first aspect of the present invention, there is provided a liquid crystal element including: a plurality of bases each having a liquid crystal orientation film, wherein the surface sides, on which the liquid crystal orientation films are formed, of the adjacent two pieces of the bases are opposed to each other with a specific gap put therebetween and a liquid crystal is arranged in the gap; wherein the liquid crystal orientation film includes: a $SiO_x$ obliquely vapor-deposited film ($_x$: positive number less than 2); and a polyvinyl alcohol based and/or nylon based thin film stacked on the obliquely vapor-deposited film to a thickness of 0.1 μm or less allowed to keep irregularities of oblique pillars of the obliquely vapor-deposited film.

According to a second aspect of the present invention, there is provided a method of manufacturing a liquid crystal element which includes a plurality of bases each having a liquid crystal orientation film, wherein the surface sides, on which the liquid crystal orientation films are formed, of the adjacent two pieces of the bases are opposed to each other with a specific gap put therebetween and a liquid crystal is arranged in the gap, the method including the steps of: forming a $SiO_x$ obliquely vapor-deposited film ($_x$: positive number less than 2) on one surface of each of the bases; coating the obliquely vapor-deposited film with a polyvinyl alcohol based water solution having a concentration of 1 wt % or less and/or a nylon based alcohol solution having a concentration of 5 wt % or less in such a manner as to keep irregularities of oblique pillars of the obliquely vapor-deposited film, and drying the water solution or alcohol solution, thereby forming a polyvinyl alcohol based and/or nylon based thin film on the obliquely vapor-deposited film.

The $SiO_x$ obliquely vapor-deposited film (orientation film) has a large pre-tilt angle and can be manufactured (formed) in a non-contact manner, and therefore, it exhibits a uniformity more stable than that of a usual polyimide based rubbing orientation film. The $SiO_x$ obliquely vapor-deposited film, however, causes polarization at an interface with a ferroelectric liquid crystal due to spontaneous polarization of molecules of the ferroelectric liquid crystal. This leads to interaction between the orientation film and the liquid crystal, tending to cause the sticking phenomenon and hysteresis phenomenon, and to increase the threshold voltage value.

The polyvinyl alcohol based thin film, known as a liquid crystal orientation film, has a low anchoring force with a ferroelectric liquid crystal. However, since the stability with an elapsed time of grooves formed by rubbing or a drawn high polymer is poor, the polyvinyl alcohol based thin film cannot be practically used.

According to the present invention, since the orientation film includes the $SiO_x$ obliquely vapor-deposited film ($_x$: positive number less than 2) and the polyvinyl alcohol based and/or nylon based thin film stacked on the obliquely vapor-deposited film to a thickness of 0.1 μm or less allowed to keep irregularities of oblique pillars of the obliquely vapor-deposited film by adjusting the concentration of the polyvinyl alcohol based water solution at 1 wt % or less and/or the concentration of the nylon based alcohol solution at 5 wt % or less, whereby the polyvinyl alcohol based and/or nylon based thin film can be stacked on the obliquely vapor-deposited film without burying the surface irregularities of the oblique pillars. Accordingly, it is possible to sufficiently exhibit the orientation of a liquid crystal due to the shapes of the $SiO_x$ pillars of the $SiO_x$ obliquely vapor-deposited film and obtain the compatibility between polyvinyl alcohol or nylon and the liquid crystal material (that is, reduction in anchoring force, and suppression in polarization and interaction between the liquid crystal and $SiO_x$), and hence to make effective use of the characteristics of the two kinds of the orientation films. This makes it possible to provide a liquid crystal element capable of reducing the threshold voltage value, temperature-dependence on light transmittance, and hysteresis phenomenon. If the thickness of the above polyvinyl alcohol based and/or nylon based thin film is more than 0.1 μm (or the concentration of the polyvinyl alcohol based water solution or nylon based alcohol solution upon coating is more than 1 wt % or 5 wt %, respectively), the above irregularities are buried with the thin film, tending to degrade the controllability of the orientation of the liquid crystal.

In the present invention, the "polyvinyl alcohol based" material mainly means partially saponificated or non-saponificated polyvinyl alcohol; however, it may include a derivative to which a certain substitutional group is introduced. Further, the polyvinyl alcohol base thin film and the nylon based thin film may be stacked on each other.

The polyvinyl alcohol based thin film is preferably made from partially saponificated or non-saponificated polyvinyl alcohol having the polymerization degree of 20,000 or less in terms of solubility of a solvent upon coating.

The liquid crystal is preferably a ferroelectric liquid crystal. In this case, it is possible to prevent the sticking phenomenon and hysteresis phenomenon due to the polarization at the interface of the orientation film, (this polarization is peculiar to a ferroelectric liquid crystal as described above), to reduce the threshold voltage value, and to lower an anchoring force thereby reducing the threshold voltage value, and hence to obtain the significant effect of the present invention.

In the manufacturing method according to the present invention, the polyvinyl alcohol based thin film and/or nylon based thin film is preferably stacked on the $SiO_x$ obliquely vapor-deposited film to a thickness (measured after drying) of 0.1 μm or less by adjusting the concentration of the polyvinyl alcohol based water solution in a range of 1.0 wt % or less and/or the concentration of the nylon based alcohol solution in a range of 5.0 wt % or less. In this case, it is possible to stack the polyvinyl alcohol based thin film and/or nylon based thin film on the $SiO_x$ obliquely vapor-deposited film in such a manner as not to bury the surface irregularities of the $SiO_x$ oblique pillars, and hence to improve the anchoring preventive effect due to the polyvinyl alcohol based thin film and/or nylon based thin film.

The liquid crystal element of the present invention can be suitably used for a liquid crystal display element, liquid crystal light modulator or liquid crystal light modulation type display element.

BRIEF DESCRIPTION OF THE DRAWINGS

FIG. 14 is a graph showing the hysteresis (34-white/2-black display) of a sample including only a SiO orientation film for each measurement temperature in Example 3;

FIG. 15 is a graph showing the hysteresis (2-white/34-black display) of a sample including only the SiO orientation film for each measurement temperature in Example 3;

FIG. 16 is a graph showing the hysteresis (34-white/2-black display) of a sample including the SiO orientation film stacked with the thin film containing 0.02 wt % of PVA for each measurement temperature in Example 3;

FIG. 17 is a graph showing the hysteresis (2-white/34-black display) of a sample including the SiO orientation film stacked with the thin film containing 0.02 wt % of PVA for each measurement temperature in Example 3;

DETAILED DESCRIPTION OF THE PREFERRED EMBODIMENTS

Hereinafter, preferred embodiments of the present invention will be described with reference to the accompanying drawings.

A structure of a liquid crystal element or a light modulation element to which the present invention is applied will be described with reference to FIGS. 1, 2, 3A and 3B, and 4A and 4B.

Figure 1:
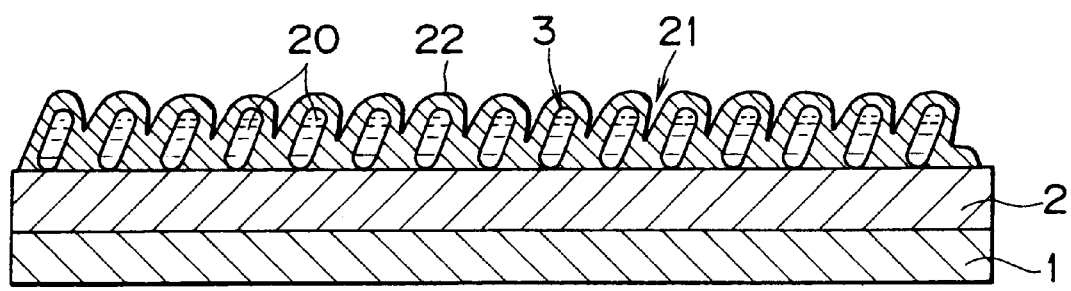
FIG. 1 is a sectional view showing an essential portion of a liquid crystal element of the present invention.

FIG. 1 shows an essential portion of a liquid crystal element (for example, a liquid crystal display element). Referring to FIG. 1, an electrode 2 made from aluminum or ITO (Indium Tin Oxide) is formed on a substrate 1 made from silicon or glass; a SiO obliquely vapor-deposited film 3 composed of pillars 20 of $SiO_x$ ($x$: positive number less than 2) such as SiO is formed on the electrode 2 to a thickness of, for example, 0.1 μm; and a partially saponificated or non-saponificated polyvinyl alcohol based (or nylon based) thin film 22 is applied on the obliquely vapor-deposited film 3 to a thickness of 0.1 μm or less allowed to keep surface irregularities 21 of the pillars 20 of the obliquely vapor-deposited film 3.

To be more specific, the polyvinyl alcohol (or nylon) based thin film 22 is stacked on the SiO orientation film 3 to such an extent as not to break shapes of the irregularities 21 of the SiO oblique pillars 20 which act as a source of a liquid crystal orientation restricting force. With respect to the SiO orientation film 3, the SiO pillars 20 are obliquely formed such that each of the heights of the irregularities 21 of the SiO pillars 20 is in a range of approximately 0.1 μm or less depending on the vapor-deposition condition upon formation of the SiO orientation film 3. The polyvinyl alcohol based thin film 22 is then formed on the surface of the SiO orientation film 3 to a thickness thin enough not to bury the irregularities 21, concretely, to a thickness of 0.1 μm or less by spin-coating. That is to say, the SiO orientation film 3 is configured such that the shapes of the SiO pillars 20 play a role in giving orientation to the liquid crystal and the upper portion of the polyvinyl alcohol thin film 22 thinly covering the SiO pillars 20 is to be in contact with a liquid crystal material.

The two substrates thus prepared are assembled into an empty liquid crystal cell using spacers (not shown) and an ultraviolet curing type adhesive (not shown) in such a manner that the vapor-depositing directions of the SiO obliquely vapor-deposited films formed on both the substrates are not parallel to each other. Then, a ferroelectric liquid crystal is poured in a gap between both the substrates of the liquid crystal cell, to thus obtain a liquid crystal display element (liquid crystal cell).

Figure 2:
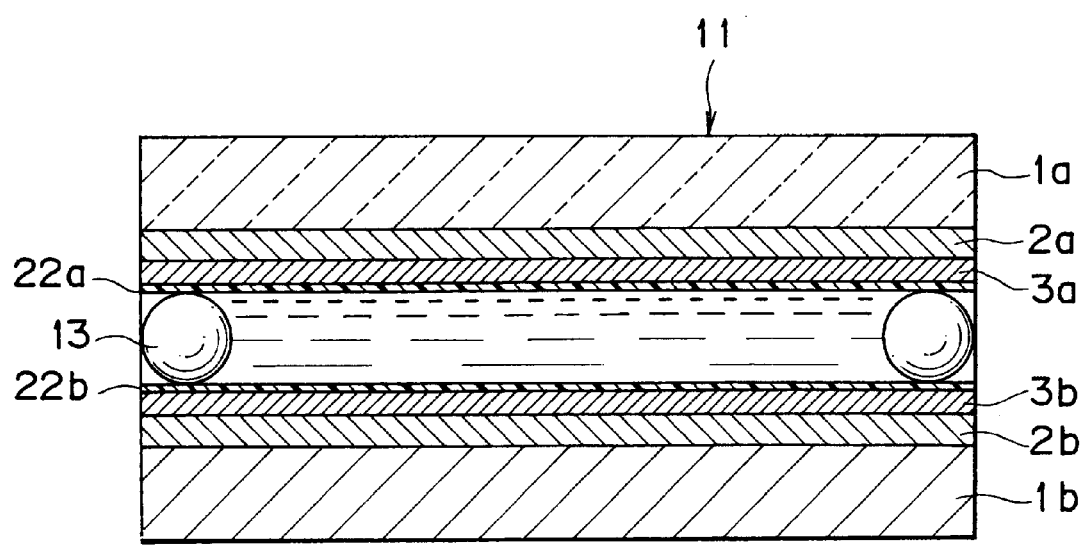
FIG. 2 is a sectional view of the liquid crystal element shown FIG. 1.
Figure 3A:
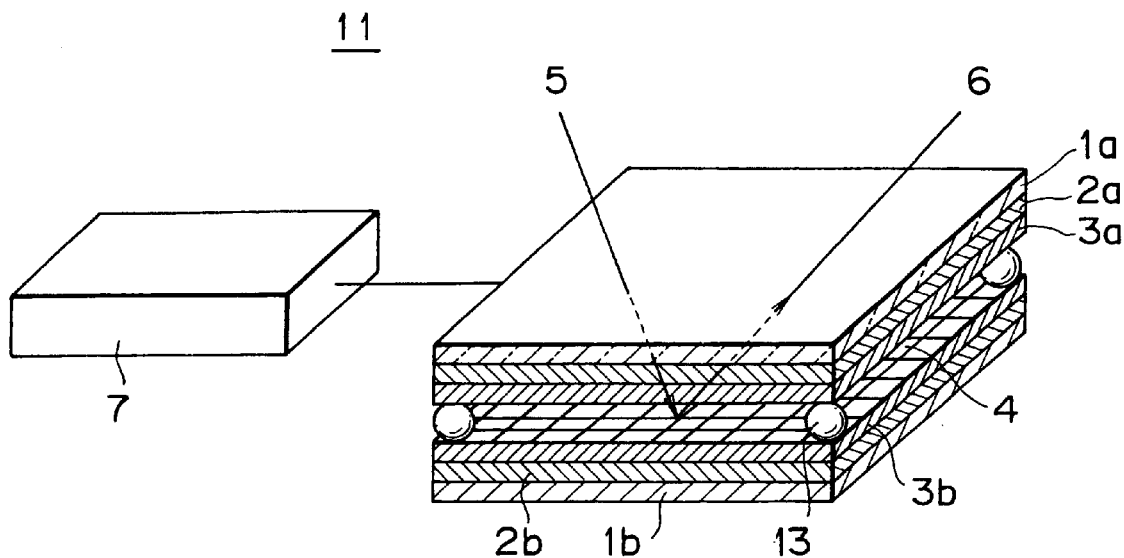
FIG. 3A is a perspective view showing one example of the structure of a reflection type ferroelectric liquid crystal display element (VLSI type) of the present invention.
Figure 3B:
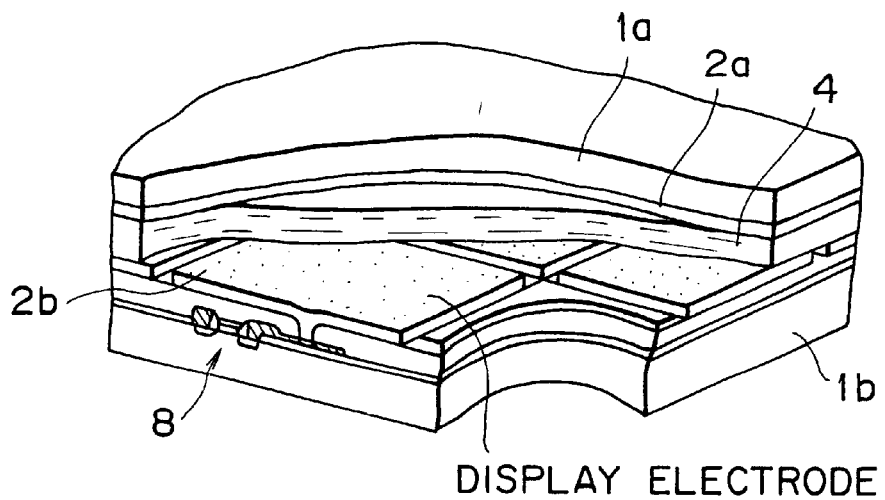
FIG. 3B is a perspective view, with parts partially cutaway, of the structure shown in FIG. 3A.

The structure of a reflection type ferroelectric liquid crystal light modulation display element 11, which is one example of the above liquid crystal display element, is schematically shown in FIG. 2 and FIGS. 3A and 3B. In this structure, a transparent electrode 2a (for example, made from ITO having a surface resistance of 100 $\Omega/cm^2$) as a common electrode is formed over the entire surface of a transparent glass substrate 1a (for example, made from Corning 7059 having a thickness of 0.7 mm).

As clearly shown in FIG. 3B, an aluminum thin film 2b serving as both a reflection film and a display electrode (drive electrode), having a matrix pattern of pixels, is formed on a silicon VLSI circuit (Very Large Scale Integrated Circuit) substrate 1b which is a counter substrate facing to the substrate 1a.

SiO obliquely vapor-deposited films (liquid crystal orientation films) 3a and 3b, each of which has the same configuration as described above, are formed on the electrodes 2a and 2b, respectively. Then, polyvinyl alcohol (or nylon) based thin films 22a and 22b, each of which has the same configuration as described above, are formed on the SiO obliquely vapor-deposited films 3a and 3b, respectively. It should be noted that these thin films 3a, 3b and 22a and 22b are not shown in FIG. 3B.

Each of the SiO obliquely vapor-deposited films 3a and 3b is formed by a manner of arranging the substrate in a vacuum vapor-deposition apparatus at a position directly over a SiO vapor-deposition source with an angle between the vertical line of the SiO vapor-deposition source and the normal line of the substrate set at 85° i; vapor-depositing SiO on the substrate in vacuum at a substrate temperature of 100° C.; and burning the SiO film thus deposited at 200° C. for one hour.

Each of the polyvinyl alcohol (or nylon) based thin films 22a and 22b is formed by a manner of diluting, for example, polyvinyl alcohol (polymerization degree: 500, no saponification) with water as a solvent at a concentration of 1 wt % or less, for example, 0.2 wt %; spin-coating the associated one of the SiO obliquely vapor-deposited film 3a and 3b with the polyvinyl alcohol based water solution thus prepared using a spinner in a condition of (500 rpm×4 sec+3,500 rpm×10 sec); and burning the polyvinyl alcohol based water solution in a clean oven at 110° C. for 60 min to remove the solvent, thus forming a polyvinyl alcohol based thin film on the associated one of the SiO obliquely vapor-deposited film 3a and 3b.

A pair of the substrates 1a and 1b thus manufactured, on each of which the orientation film is formed, are assembled such that the orientation treatment directions of the opposed SiO obliquely vapor-deposited films 3a and 3b on the common electrode 2a side and drive electrode 2a side are not parallel to each other. In addition, the substrates 1a and 1b, however, may be assembled such that the orientation treatment directions be parallel to each other. As spacers 13 provided between both the substrates 1a and 1b, there are used glass beads (true balls each having a diameter of 0.6 to 3.0 μm, for example, those sold by Catalysts & Chemicals Industries Co. Ltd.). The size of each of the glass beads is determined depending on a gap between both the substrates 1a and 1b.

The arrangement of the spacers 13 differs depending on the size of the substrate area. When each of the substrates 1a and 1b has a small area, the above-described true balls are dispersed, at a concentration of for example about 0.3 wt %, in a sealing material composed of an ultraviolet curing type adhesive (for example, Photolec sold by Sekisui Chemical Co., Ltd.) used for adhesively bonding the peripheries of the substrates 1a and 1b to each other, to thereby control the gap between the substrates 1a and 1b. When each of the substrates 1a and 1b has a large area, the true balls are scattered between the substrates 1a and 1b at an average density of for example 100 pieces/mm$^2$, followed by adjustment of the gap between the substrates 1a and 1b, and the peripheries of the substrates 1a and 1b are adhesively bonded to each other by means of a sealing material with a liquid crystal pouring hole left.

A ferroelectric liquid crystal 4 (for example, CS-1022, CS-1016, CS-1017, or CS-1025, sold by Chisso Corporation) is poured between the pair of substrates 1a and 1b. The ferroelectric liquid crystal (composition) is poured under a reduced pressure in a state in which it is heated at a temperature where the liquid crystal exhibits flowability, for example, at an isotropic phase temperature or chiral nematic phase temperature. The pair of substrates 1a and 1b having been filled with the liquid crystal are gradually cooled; the liquid crystal stuck on portions, around the pouring hole, of the substrates 1a and 1b are removed; and the peripheries of the substrates 1a and 1b are sealed with an epoxy based adhesive. In this way, the ferroelectric liquid crystal light modulation display element 11 is manufactured.

Figure 25:
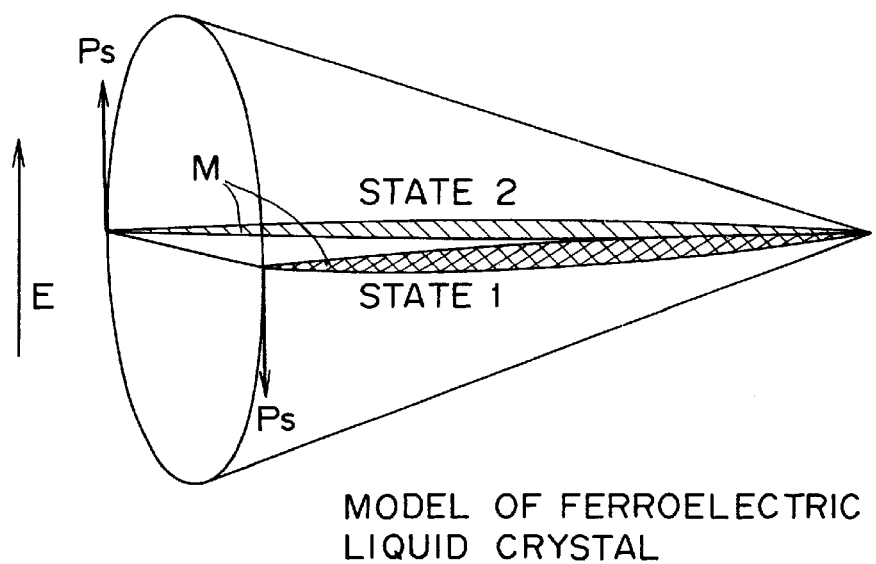
FIG. 25 is a diagram showing a model of a bistable mode of a ferroelectric liquid crystal.
Figure 26:
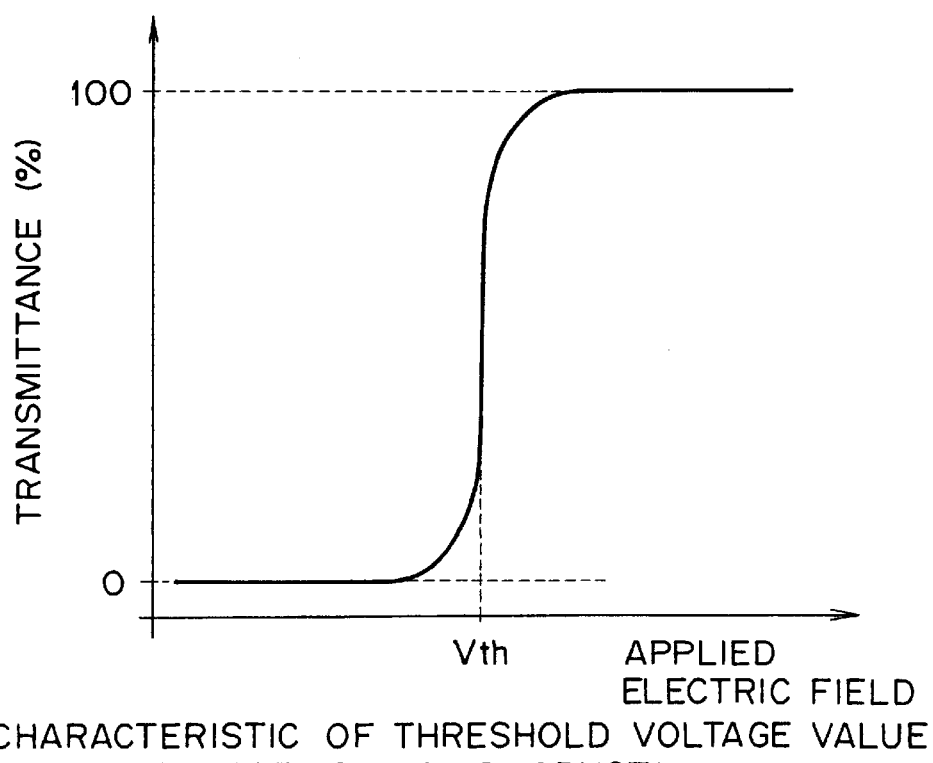
FIG. 26 is a graph (V-T curve) showing the characteristic of the threshold voltage value of a general ferroelectric liquid crystal.
Figure 27:
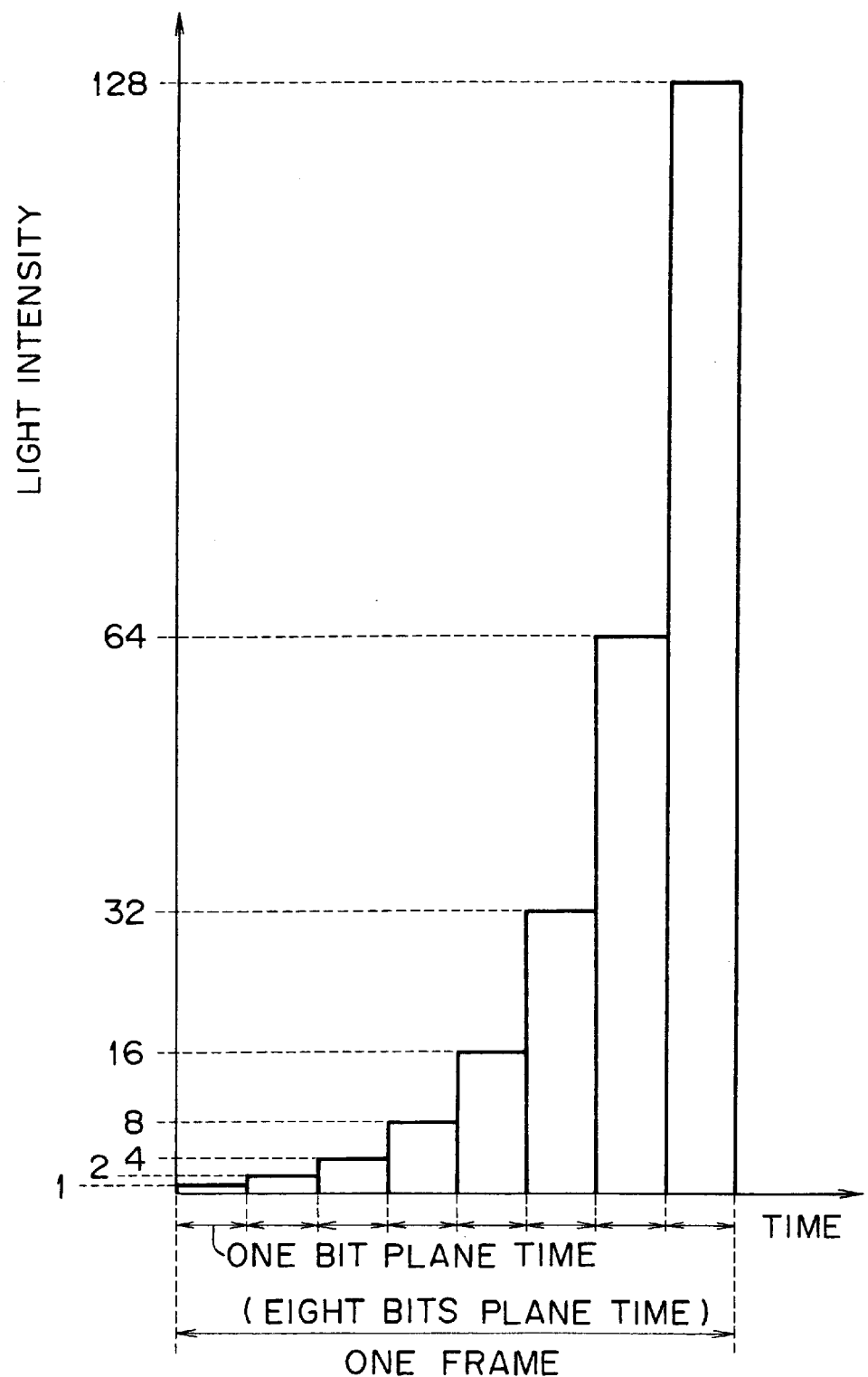
FIG. 27 is a schematic diagram illustrating weighting in one frame of a light intensity modulation type liquid crystal display element.

With respect to the ferroelectric liquid crystal element (for example, surface stabilized ferroelectric liquid crystal element), as shown in FIG. 25, the orientation of the liquid crystal molecules M is switched between states 1 and 2 depending on an external electric field E (Ps: spontaneous polarization) applied to the liquid crystal. When the liquid crystal element is arranged between crossed-sheet polarizers, the change in orientation of the molecules M is converted into a change in light transmittance. For example, as shown in FIG. 26, the transmittance is rapidly changed from 0% to 100% at a threshold voltage $V_{th}$.

As shown in FIG. 2 and FIGS. 3A and 3B, pixels of the ferroelectric liquid crystal light modulation display element 11 are two-dimensionally arranged. These pixels, however, may be linearly arranged. As shown in FIG. 3A, an incident light ray 5 is reflected from the electrode 2b serving as the reflection film. At this time, the light transmittance of the ferroelectric liquid crystal (FLC) 4 located in the optical path is changed depending on an electric field applied between the electrodes 1b and 2b as shown in FIG. 26. That is to say, the intensity of a reflection light ray 6 is modulated depending on the intensity of the electric field applied between the electrodes 1b and 2b, so that either the light reflection state or non-light reflection state is selected for each pixel.

The supply of a signal to the electrode 2b is controlled, for each pixel, by a control circuit 7 located outwardly from the ferroelectric liquid crystal light modulation display element 11; however, it may be controlled by a circuit incorporated in the silicon VLSI circuit substrate 1b. The supply of voltage is performed by scanning each pixel or each group of a plurality of pixels, or simultaneously scanning all pixels.

In the case where the supply of a signal voltage is controlled by the VLSI circuit substrate 1b, as shown in FIG. 3B, a control gate element (or switching element) 8 configured as a MOS (or bipolar) type transistor may be additionally integrated with each pixel. In this case, since the liquid crystal 4 exhibits a storing characteristic after switching, the control gate element 8 does not require any auxiliary capacity; however, a capacitor (not shown) may be incorporated to give an auxiliary capacity for making longer the drive time.

While not shown, a memory element [for example, a memory cell composed of a dynamic RAM (Random Access Memory) or a static RAM] connected to the control gate element 8 can be incorporated in the VLSI circuit substrate 1b. A capacitor to give an auxiliary capacity can be also connected to the control gate element 8.

Figure 4A:
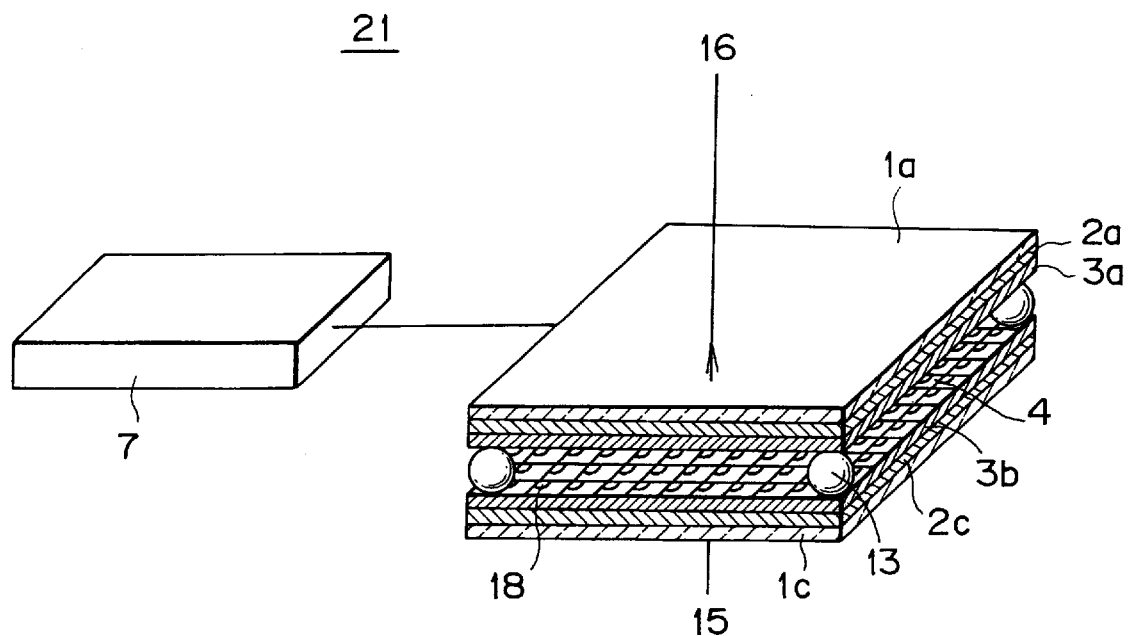
FIG. 4A is a perspective view showing one example of a transmission type ferroelectric liquid crystal display element (TFT transmission type) of the present invention.
Figure 4B:
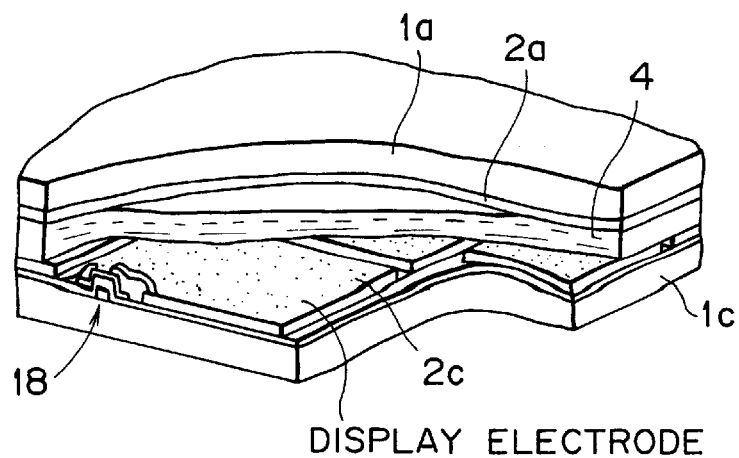
FIG. 4B is a perspective view, with parts partially cutaway, of the structure shown in FIG. 4A.

The present invention can be applied to a light transmission type liquid crystal element 2c shown in FIGS. 4A and 4B in which the display electrode side is made transparent.

The transmission type element is basically different from the reflection type element shown in FIGS. 3A and 3B in that a drive electrode made from a transparent ITO 2c provided on a glass substrate 1c is driven, for each pixel, by a control gate element 18 composed of a TFT (Thin Film Transistor) in such a manner as to allow transmission of an incident light ray 15 as a transmission light ray 16 or cut off transmission of the incident light ray 15 on the basis of the ON-OFF control of a signal voltage. The control gate element 18 may be connected with a capacitor to give an auxiliary capacity.

In the transmission type element shown in FIGS. 4A and 4B, like the reflection type element, the control gate element 18 may be connected with a memory cell composed of a DRAM or the like.

According to the present invention, the above ferroelectric liquid crystal may be replaced with an antiferroelectric liquid crystal (AFLC). In the AFLC, all of permanent dipoles in one layer are arranged in one direction but all of permanent dipoles in the adjacent layer are arranged almost in the reversed direction, so that spontaneous polarizations in the adjacent two layers are canceled each other and thereby any macro-spontaneous polarization does not exist in the AFLC. Here, like the ferroelectric liquid crystal, the spontaneous polarization in each layer is parallel to the layer and is perpendicular to the major axes of molecules.

The phase of the antiferroelectric liquid crystal (AFLC) is transferred to a ferroelectric phase by applying an electric field equal to or more than a threshold value to the AFLC. That is to say, dipoles having been arranged in the direction reversed to that of the applied electric field are inverted by applying the electric field to the AFLC, so that all of the dipoles are arranged in the direction of the applied electric field.

An AFLC display, which is similar to the FLC display, may be manufactured in the same manner as that for the FLC display except that an antiferroelectric liquid crystal (for example, CS-4000 sold by Chisso Corporation) is used as the liquid crystal material.

Hereinafter, examples in which the present invention is applied to a ferroelectric liquid crystal element will be described in detail.

EXAMPLE 1

A transparent ITO film (surface resistance: 100 $\Omega/cm^2$) having a thickness of 0.04 μm was formed on a glass substrate by sputtering. Then, a SiO obliquely vapor-deposited film (liquid crystal orientation film) having a thickness of 0.05 μm was vapor-deposited on the above glass substrate in vacuum at a substrate temperature of 80° C. The vapor-deposition was performed by a manner of locating a tantalum boat (sold by Japan Backs Metal Kabushiki Kaisha) filled with a SiO powder (purity: 99.99%, sold by Furuuchi Chemical Co., Ltd.) at a position directly over the glass substrate with an angle between the normal line of the substrate and the vertical line of the vapor-deposition source set at 85°; and resistance-heating the tantalum boat filled with the SiO powder in vacuum. After vapor-deposition, the glass substrate on which the SiO obliquely vapor-deposited film was formed on the ITO film was burned in atmospheric air at 200° C. for one hour for improving the orientation characteristic.

Next, four kinds of polyvinyl alcohol based water solutions were prepared by diluting polyvinyl alcohol (polymerization degree: 500, no saponification) with water as a solvent at four kinds of concentrations (0.02 wt %, 0.2 wt %, 1 wt %, and 2 wt %). Each polyvinyl alcohol based water solution was applied on the SiO obliquely vapor-deposited film by spin-coating using a spinner in a condition of (500 rpm×4 sec+3,500 rpm×10 sec). After spin-coating, the glass substrate on which the water solution was applied on the SiO obliquely vapor-deposited film was burned in a clean oven at 110° C. for 60 min, to remove the solvent, thus forming the polyvinyl alcohol based film on the SiO obliquely vapor-deposited film.

For comparison, only water (having been used as the solvent in the above) was applied on the SiO obliquely vapor-deposited film by spin-coating, followed by burning in the same manner as described above, to prepare a sample with no stacked film.

Two pieces of the glass substrates thus processed were assembled into an empty liquid crystal cell using spacers (true balls, sold by Catalysts $ Chemicals Co., Ltd.) each having a diameter of 1.6 μm and an ultraviolet curing type adhesive (Photolec, sold by Sekisui Fine Chemical Kabushiki Kaisha) in such a manner that the vapor-depositing directions of the SiO obliquely vapor-deposited films formed on both the substrates are not parallel to each other. A ferroelectric liquid crystal (CS-1025 sold by Chisso Corporation) was poured in a gap between both the substrates of the cell, to thus obtain a liquid crystal display element (FLC display) composed of only one pixel.

Figure 5:
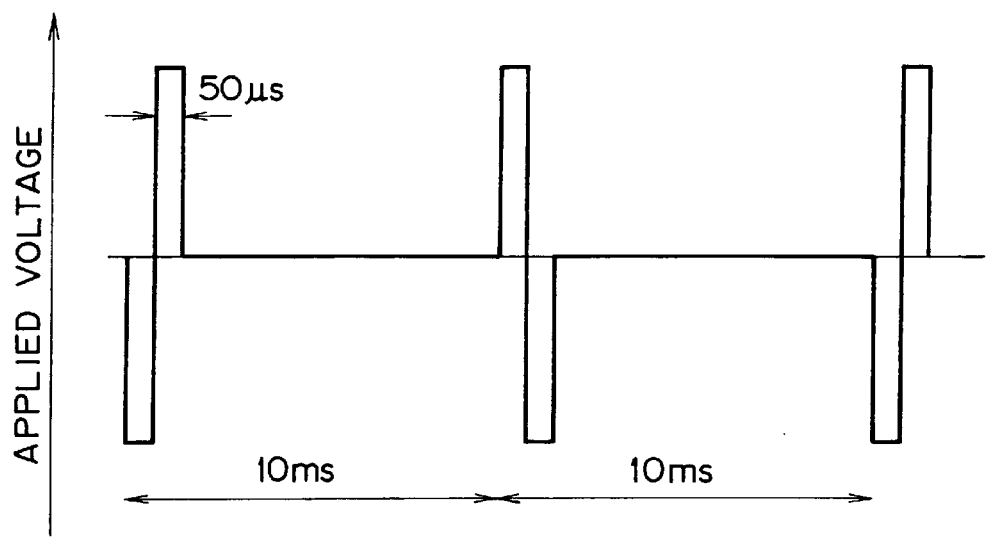
FIG. 5 is a diagram showing the waveform of a drive voltage for measuring the threshold voltage value of a ferroelectric liquid crystal display element in Example 1.

With respect to the sample liquid crystal display elements (liquid crystal panels) thus prepared, the temperature-dependence on the threshold voltage value was first examined. A drive voltage having a waveform shown in FIG. 5 was applied to the sample element under crossed-Nicols, and the intensity of transmission light was monitored.

For the sample element with the SiO orientation film stacked with polyvinyl alcohol (PVA) at the concentration of 2 wt %, the orientation of the liquid crystal was disturbed, failing to measure the temperature-dependence on the threshold voltage value. The reason for this may be considered to be due to the fact that the irregularities of the SiO oblique pillars be flattened by the thick PVA film. The result of measuring the temperature-dependence on the threshold voltage value for each sample element is shown in FIG. 6, and a relationship between the threshold voltage value and each concentration of the PVA based water solution measured at each temperature is shown in FIG. 7.

Figure 6:
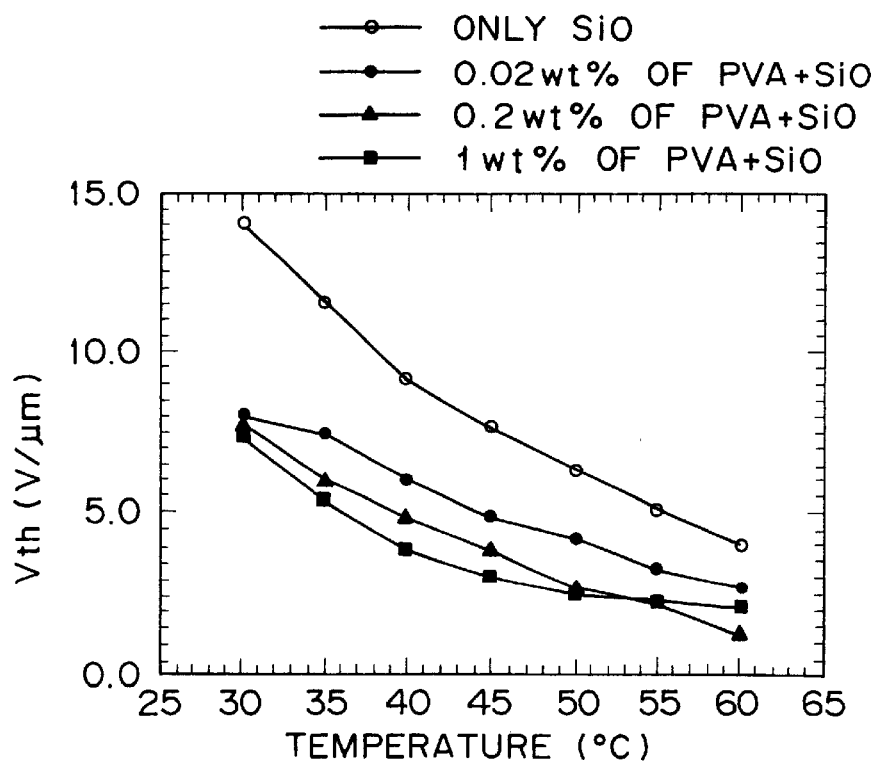
FIG. 6 is a graph showing the temperature-dependence on the threshold voltage value in each orientation film in Example 1.

As shown in FIG. 6, in each sample element with the SiO orientation film stacked with PVA, the temperature-dependence on the threshold voltage value was made smaller than that of the sample element with only the SiO orientation film. To be more specific, for the sample element with only the SiO orientation film, the threshold voltage value was 3.5 V/(40–50° C.); for the sample element with the SiO orientation film stacked with PVA at the concentration of 0.02 wt %, the threshold voltage value was 2.0 V/(40–50° C.); for the sample element with the SiO orientation film stacked with PVA at the concentration of 0.2 wt %, the threshold voltage value was 1.7 V/(40–50° C.); and for the sample element with the SiO orientation film stacked with PVA at the concentration of 1 wt %, the threshold voltage value was 1.47 V/(40–50° C.).

Figure 7:
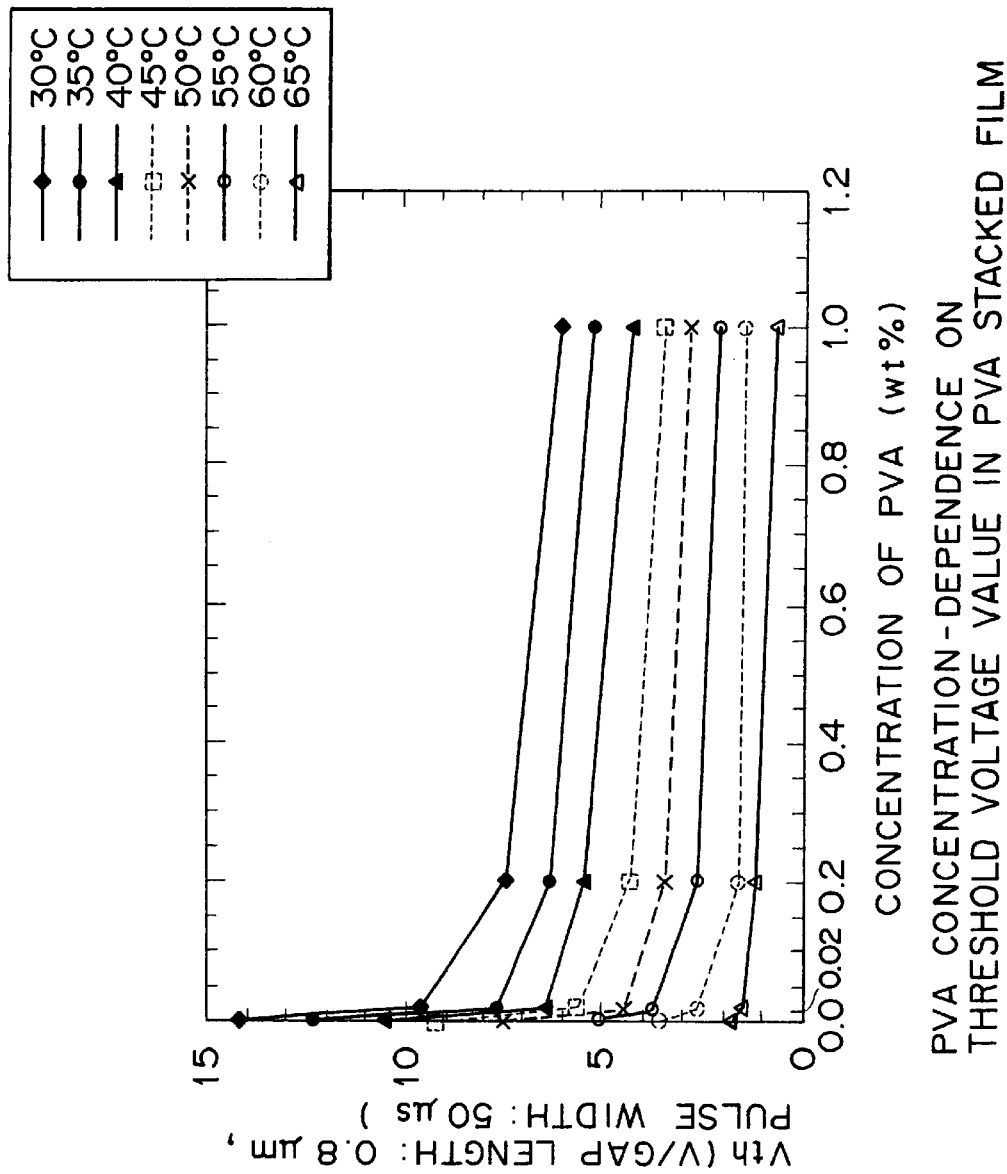
FIG. 7 is a graph showing a change in threshold voltage depending on a concentration of polyvinyl alcohol (PVA) upon formation of an orientation film at each measurement temperature in Example 1.

As shown in FIG. 7, in the sample element with the SiO orientation film stacked with PVA at the concentration of 0.02 wt % (0.2 wt %, 1 wt %), the threshold voltage value, for example measured at 40° C., was reduced to 62% (51%, 40%) of that of the sample element with only the SiO orientation film, respectively.

EXAMPLE 2

The mechanism why the threshold voltage value is reduced by the presence of the PVA film stacked on the SiO orientation film will be described below.

1. Estimation of Anchoring Energy

With respect to a ferroelectric liquid crystal, any method has been not known of measuring an anchoring energy between a liquid crystal and an orientation film, and the value of the anchoring energy has been schematically estimated using the anchoring energy measured for a nematic liquid crystal as an alternative value. However, for a physical understanding of the threshold voltage value (any equation for determining the threshold voltage value has been not known) and for an understanding of a sticking mechanism, it is very important and useful to have a knowledge about an anchoring energy between a ferroelectric liquid crystal and an orientation film. In view of the foregoing, the present inventor has contrived a method of measuring an anchoring energy between a ferroelectric liquid crystal and an orientation film.

The method of electroptically measuring a test cell is advantageous in that the test cell is simply tested by measuring a change in transmittance with an elapsed time, and therefore, such a method has been commonly used for experiments of liquid crystals in all the world. In this method, since a manual measurement error can be avoided using a high speed (about 1 M) amplifier for applying an electric field, the high reliability of the method can be ensured. For this reason, it has been attempted by the present inventor to measure the above-described anchoring energy in accordance with the electrooptic measurement method. As a result of observation of a change in transmittance when an electric field is applied, it becomes apparent that such a change in transmittance exhibits a wavefom shown in FIG. 8.

Figure 8:
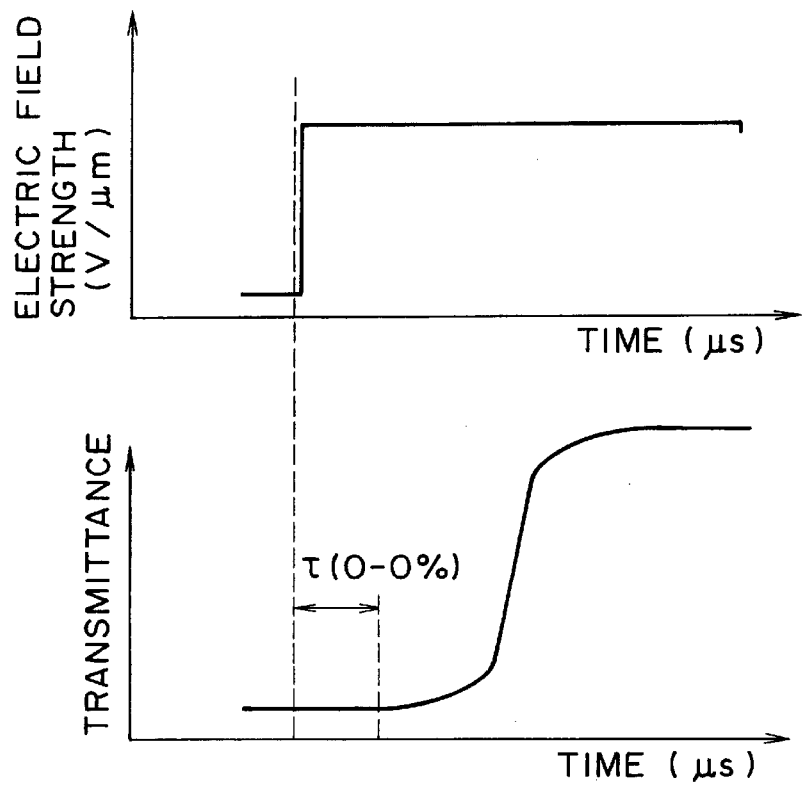
FIG. 8 is a chart showing a change in transmittance depending on an applied electric field upon evaluation of anchoring of the orientation film in Example 2.

Referring to FIG. 8, there exists a delay time $\tau(0\text{-}0\%)$ until the transmittance is changed after an electric field is applied. The delay time at which the transmittance is not changed even though the electric field is applied is related to the mobility of liquid crystal molecules due to the electric field, and therefore, such a delay time may be considered to correspond to the concept of the anchoring energy. In this regard, using the sample element with only the SiO orientation film in Example 1, the relationship between the applied electric field and the delay time $\tau(0\text{-}0\%)$ was measured. The result is shown in FIG. 9.

Figure 9:
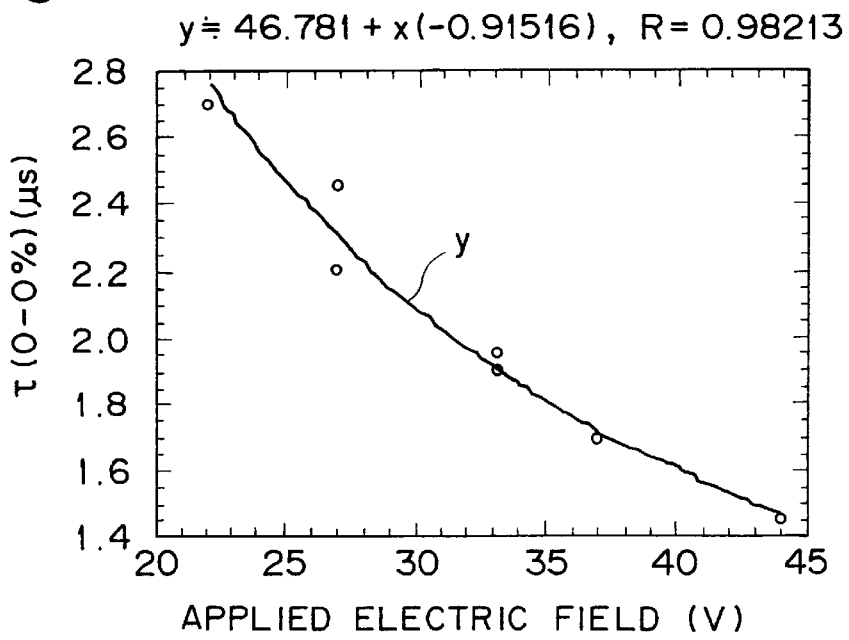
FIG. 9 is a graph showing a relationship between an applied electric field and a delay time until the transmittance is changed after the electric field is applied in Example 2.

As is apparent from FIG. 9, the product of the applied electric field strength and the delay time $\tau(0\text{-}0\%)=E\times\tau(0\text{-}0\%)$ is substantially constant, and therefore, it may be considered that the tendency of the above impulse correspond to that of the anchoring energy.

2. Mechanism of Reducing Threshold Voltage Value by Stacking PVA on SiO Orientation Film Each sample element was prepared by stacking a PVA based water solution (concentration: 0.02 wt %, 0.2 wt %, 1 wt %) on a SiO obliquely vapor-deposited orientation film by spin-coating and burning it in accordance with the same manner as that in Example 1. A comparative sample element was also prepared by coating a SiO orientation film with only water by spin-coating and burning it in accordance with the same manner as that in Example 1. Incidentally, as described above, from the result shown in FIG. 6 which shows the characteristic of the threshold voltage value of the PVA stacked orientation film in the sample element using the liquid crystal (CS-1025), it is revealed that the threshold voltage value becomes smaller as the thickness of the PVA stacked layer becomes larger, that is, the concentration of PVA becomes higher.

2-1. Examination in Terms of Anchoring Energy

Figure 10:
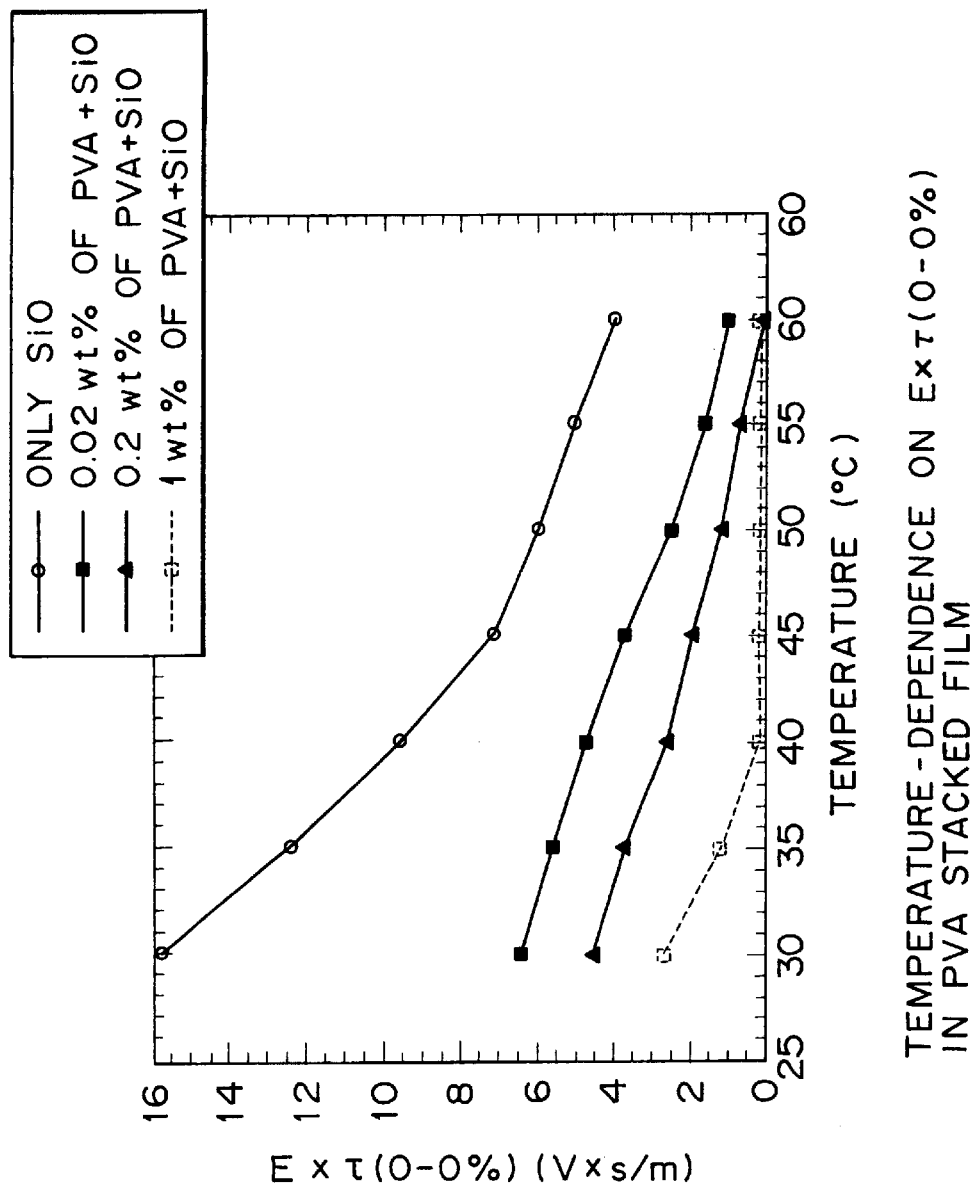
FIG. 10 is a graph showing the temperature-dependence on an anchoring energy in each PVA stacked film for each concentration of PVA in Example 2.

The value of E×τ(0-0%) of each sample element was measured. The results are shown in FIG. 10. As shown in FIG. 10, the anchoring energy becomes smaller and the temperature-dependence on the anchoring energy also becomes lower as the thickness of the PVA stacked film becomes larger. The reason why the anchoring energy is reduced with increasing temperature is as follows: namely, like the cause of the sticking phenomenon, the anchoring may result from the fact that the polarization of the orientation film occurring due to the spontaneous polarization of the ferroelectric liquid crystal molecules causes interaction between the liquid crystal molecules and the orientation film, and accordingly, since the polarization becomes weak at a higher temperature, the anchoring energy is reduced with increasing temperature.

Figure 11:
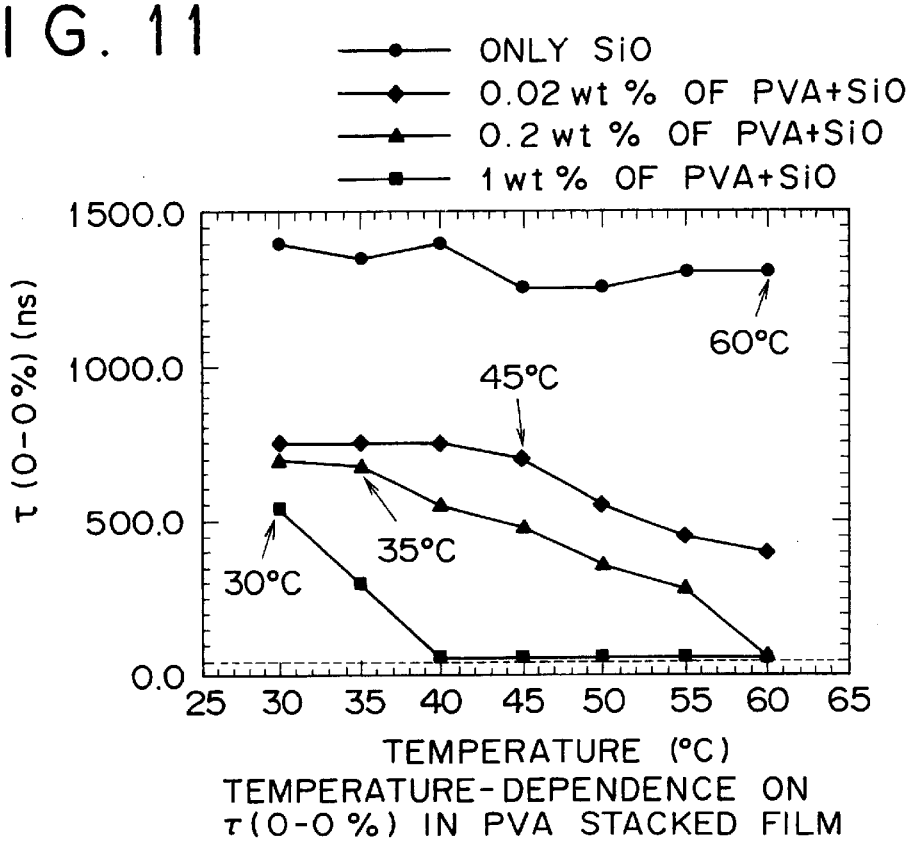
FIG. 11 is a graph showing the temperature-dependence on the delay time in each PVA stacked film for each concentration of PVA in Example 2.

The result of measuring the temperature-dependence on the delay time τ(0-0%) for each sample element is shown in FIG. 11. As shown in FIG. 11, for the sample element with only the SiO orientation film, the delay time until the transmittance is changed after the electric field is applied is little dependent on temperature. For the sample element with the SiO orientation film stacked with PVA at the concentration of 1 wt %, the delay time has a large temperature-dependence; for example, the value of the delay time at 40° C. or more becomes identical to the rising time of the amplifier. That is to say, for this sample element (concentration of PVA: 1 wt %), at a temperature of 40° C. or more, when the electric field is applied, the switching is simultaneously started. For the sample element with the SiO orientation film stacked with PVA at each of the concentrations of 0.02 wt % and 0.2 wt %, the value of the delay time is between those of the sample element (only SiO orientation film) and the sample element (concentration of PVA: 1 wt %), and the temperature range with no temperature-dependence on the delay time becomes lower as the thickness of the PVA stacked film becomes larger. For example, for the sample element (concentration of PVA: 0.02 wt %), the temperature range with no temperature-dependence on the delay time is 45° C. or less; while for the sample element (concentration of PVA: 0.2 wt %), the temperature range with no temperature-dependence on the delay time is 35° C. or less.

As a result, it may be considered that the anchoring energy is reduced and the threshold voltage value is lowered by stacking PVA on the SiO obliquely vapor-deposited orientation film. The sticking phenomenon may be reduced for the same reason.

2-2. Examination in Terms of Rotational Viscosity

Parameters determining the threshold voltage value may include not only the anchoring energy but also the anisotropic dielectric constant and spontaneous polarization affected by the electric field and the rotational viscosity exerting an effect on an elastic energy. Here, the temperature-dependence on rotational viscosity was measured using a tester (APTII, sold by Display Tech Kabushiki Kaisha). The results are shown in FIG. 12.

Figure 12:
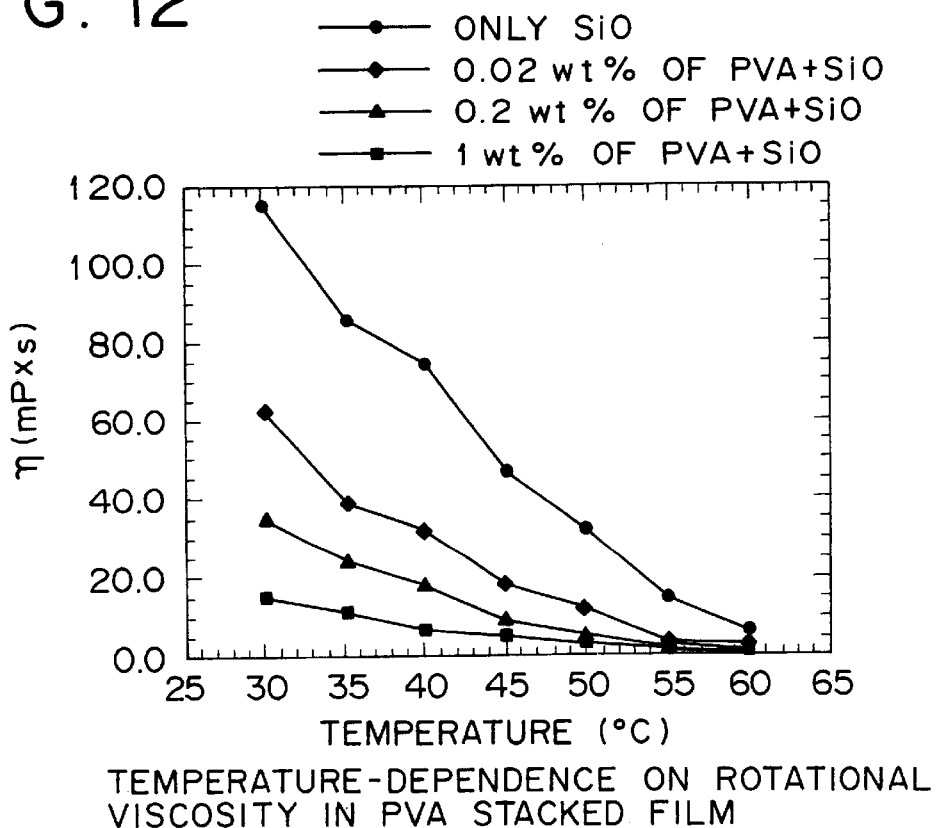
FIG. 12 is a graph showing the temperature-dependence on the rotational viscosity of liquid crystal molecules in each PVA stacked film for each concentration of PVA in Example 2.

As shown in FIG. 12, the rotational viscosity becomes very lower by stacking PVA on the SiO orientation film. In consideration of an equation of $\gamma_r \gamma_0 \sin^2 \theta$ where $\gamma_r$ is a rotational viscosity, $\gamma_0$ is a viscosity, and $\theta$ is a tilt angle, it becomes apparent that the viscosity also becomes lower by stacking PVA on the SiO orientation film. For the same liquid crystal material, the reduction in viscosity may be considered to be due to looseness of packing of molecules. The packing of molecules is mainly determined due to a combination of a pre-tilt angle and a layer tilt angle. Accordingly, it may be considered that the packing of molecules is loosened by stacking of PVA, to lower the viscosity, thereby reducing the threshold voltage value.

EXAMPLE 3

Figure 18:
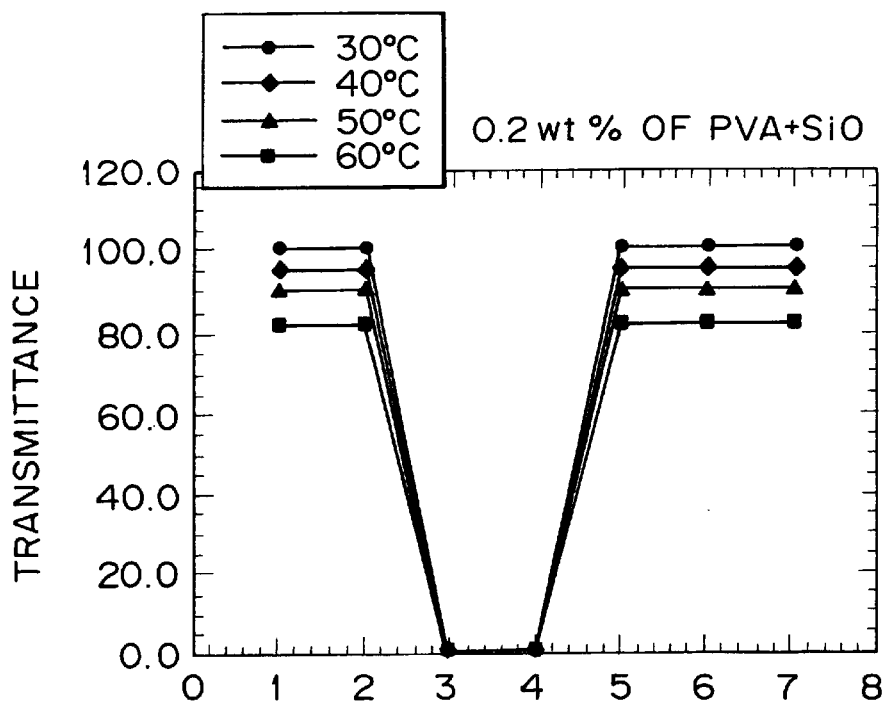
FIG. 18 is a graph showing the hysteresis (34-white/2-black display) of a sample including the SiO orientation film stacked with a thin film containing 0.2 wt % of PVA for each measurement temperature in Example 3.
Figure 19:
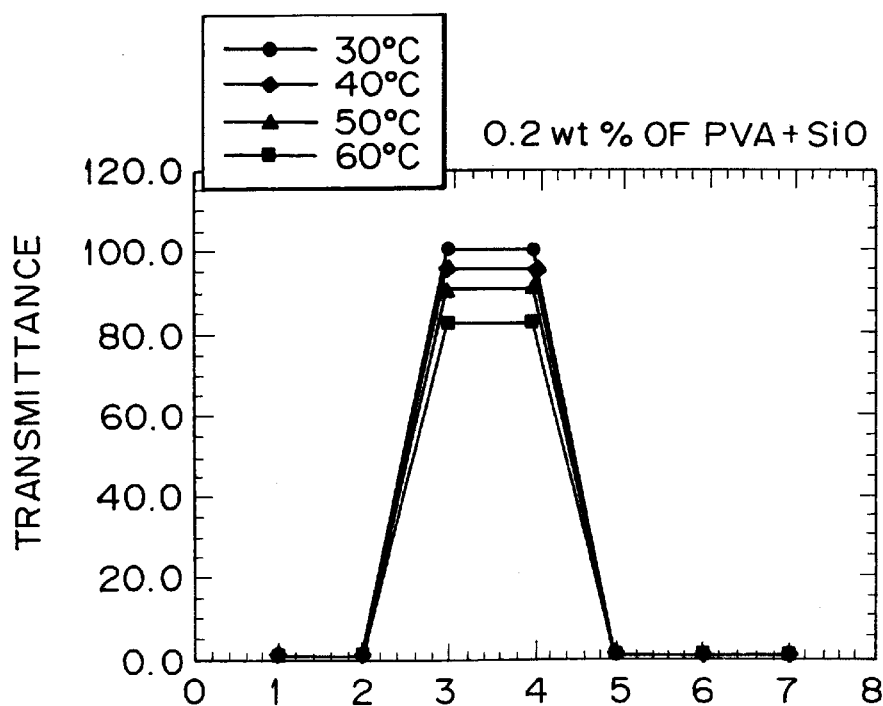
FIG. 19 is a graph showing the hysteresis (2-white/34-black display) of a sample including the SiO orientation film stacked with the thin film containing 0.2 wt % of PVA for each measurement temperature in Example 3.
Figure 20:
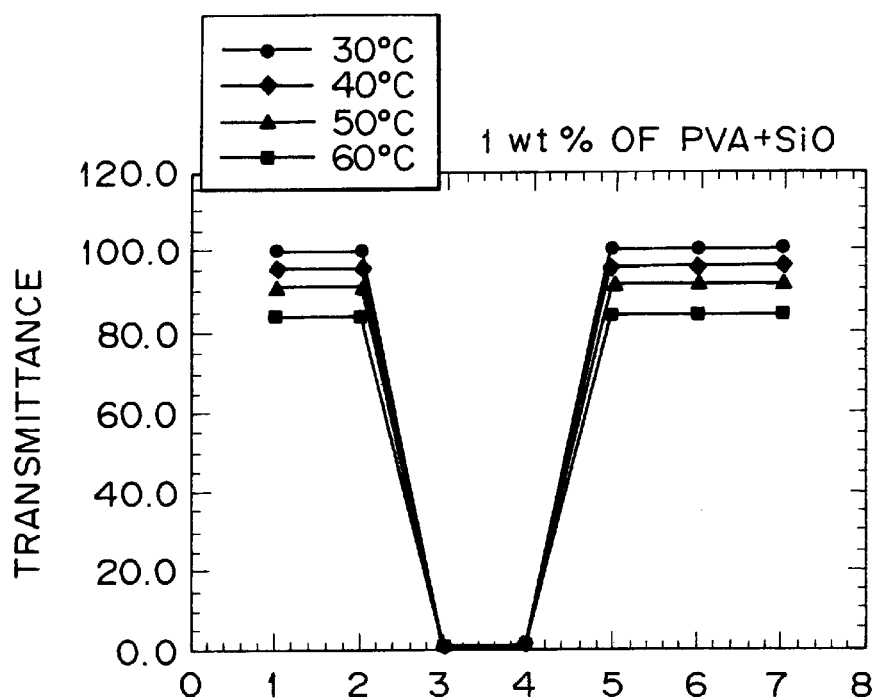
FIG. 20 is a graph showing the hysteresis (34-white/2-black display) of a sample including a SiO orientation film stacked with a thin film containing 1 wt % of PVA for each measurement temperature in Example 3.
Figure 21:
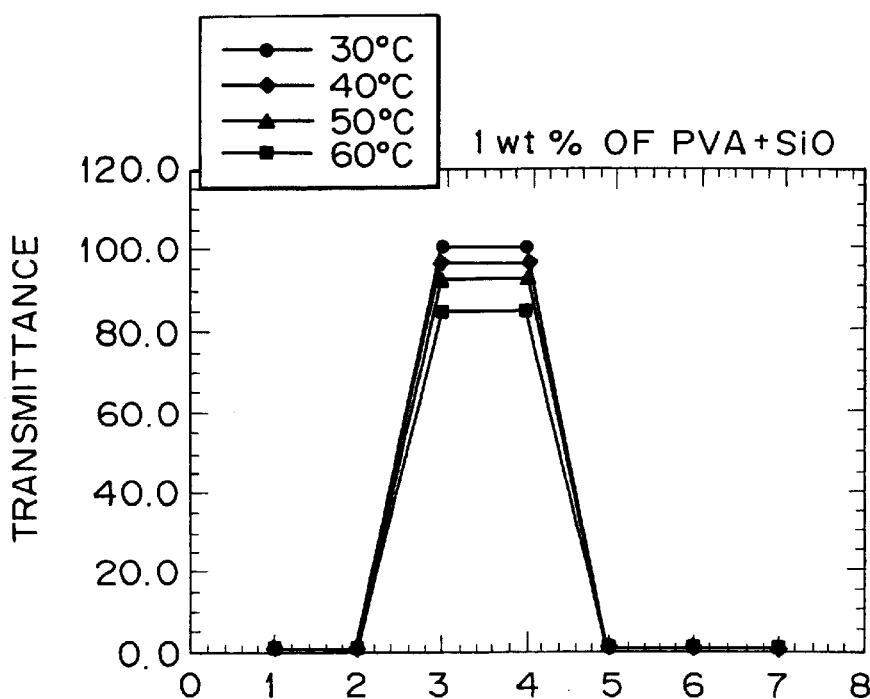
FIG. 21 is a graph showing the hysteresis (2-white/34-black display) of a sample including the SiO orientation film stacked with the thin film containing 1 wt % of PVA for each measurement temperature in Example 3.

The hysteresis of each sample element was then measured. In this measurement, voltages having two kinds of waveforms (a) and (b) [(a): 34-white/2-black display, (b) 2-white/34-white display] shown in FIG. 13 were applied to the sample element, and a change in transmittance was monitored. The results for the sample element with only the SiO orientation film are shown in FIG. 14 (white display) and FIG. 15 (black display); the results for the sample element with the SiO orientation film stacked with PVA at the concentration of 0.02 wt % of PVA are shown in FIG. 16 (white display) and FIG. 17 (black display); the results for the sample element with the SiO orientation film stacked with PVA at the concentration of 0.2 wt % of PVA are shown in FIG. 18 (white display) and FIG. 19 (black display); and the results for the sample element with the SiO orientation film stacked with PVA at the concentration of 1 wt % of PVA are shown in FIG. 20 (white display) and FIG. 21 (black display) It should be noted that in FIGS. 14 to 21, the numeral on the abscissa corresponds to the position on the time axis in FIG. 13).

Figure 13:
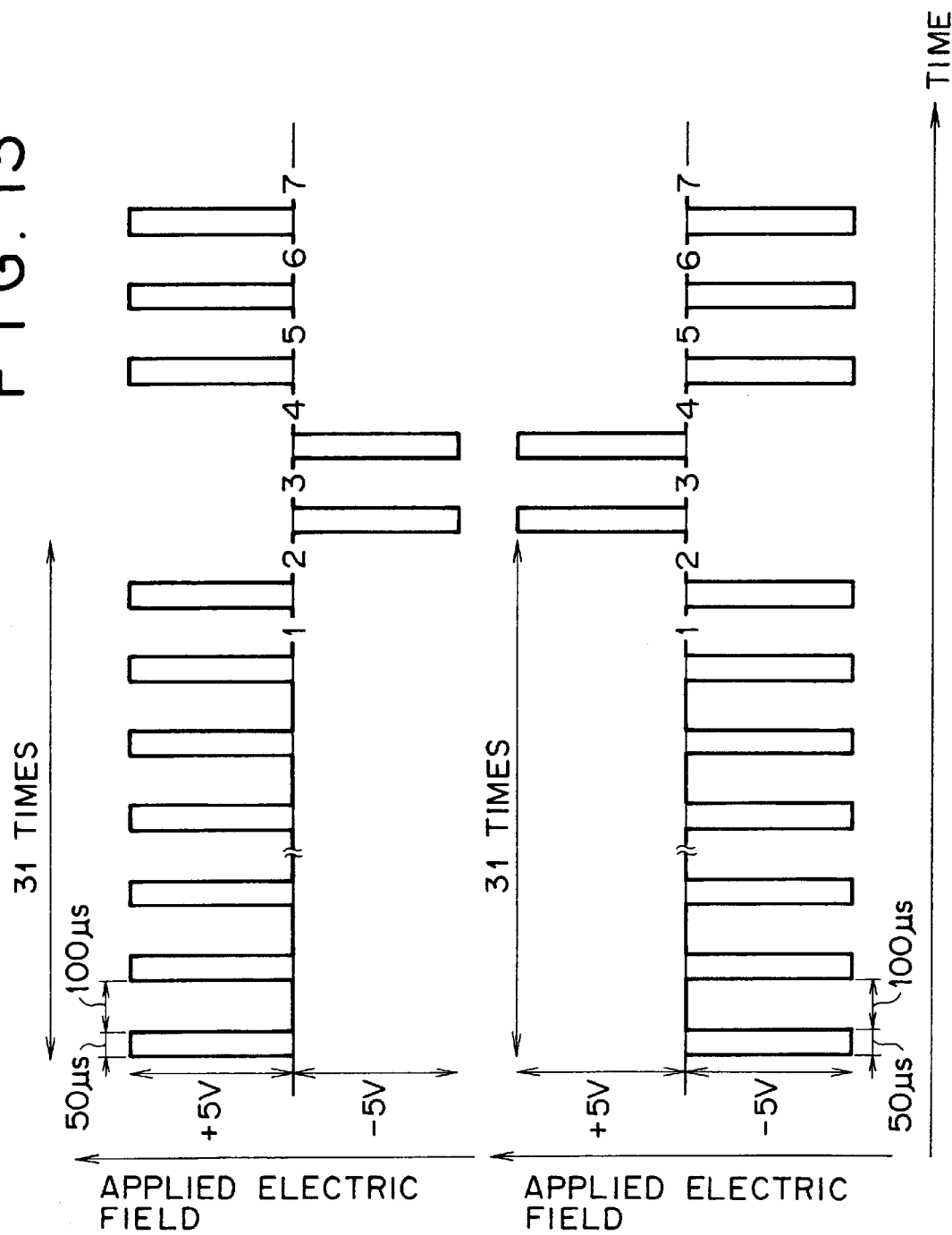
FIG. 13 is a diagram showing waveforms [(a): 34-white/2-black display, (b) 2-white/34-black display] of applied voltages for measuring the hysteresis phenomenon of a ferroelectric liquid crystal display element in Example 3.

The hysteresis is estimated, on the basis of the results shown in FIGS. 14 to 21, by comparing the fifth transmittance corresponding to the fifth position in FIG. 13 (at which the hysteresis is liable to appear) with the first and second transmittances corresponding to the first and second positions in FIG. 13. As a result, it can be confirmed that the hysteresis is reduced by stacking the PVA thin film.

Figure 22:
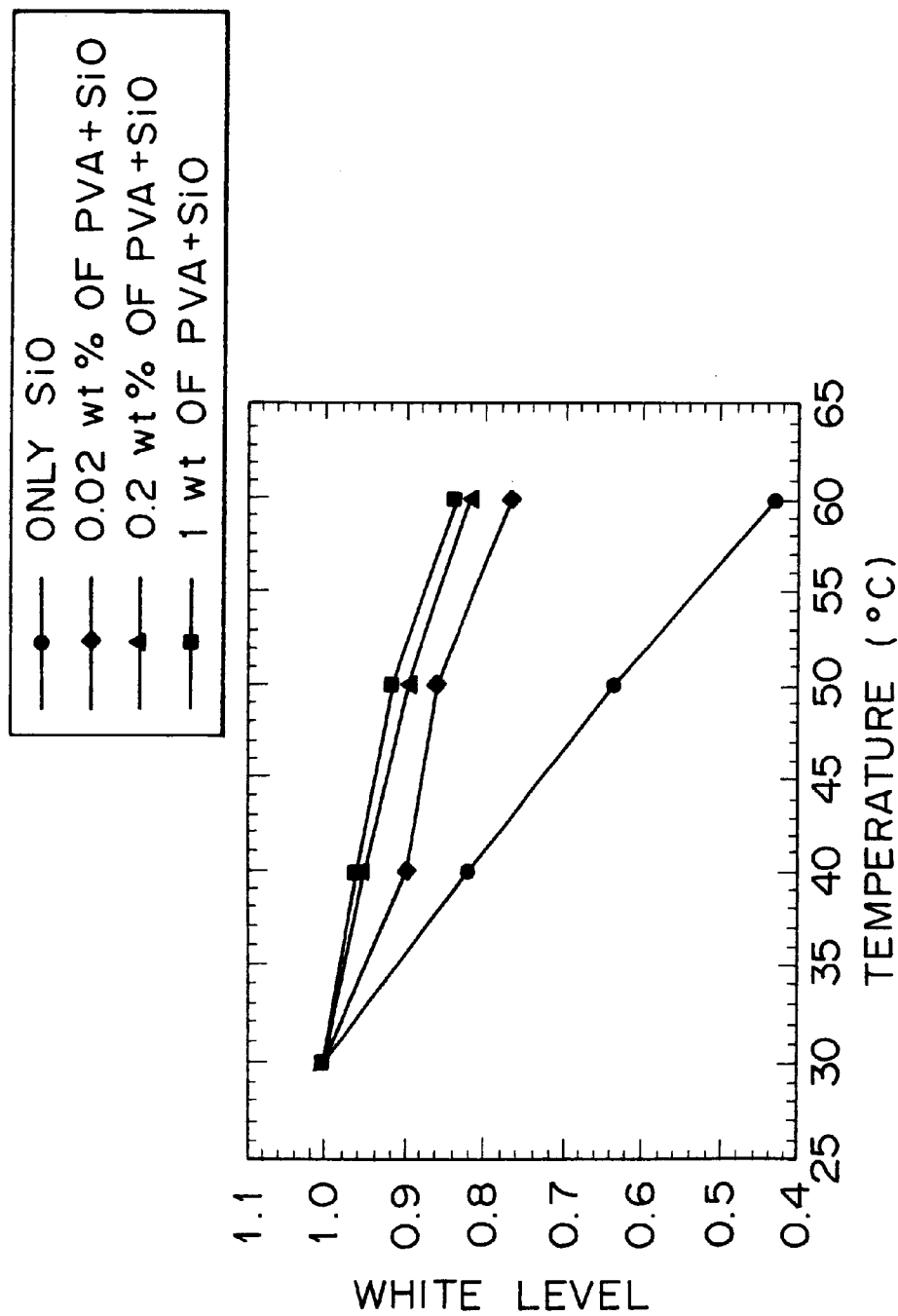
FIG. 22 is a graph showing the temperature-dependence on transmittance at the white level in each orientation film for each concentration of PVA.

The temperature-dependence on the white level is shown in FIG. 22. As the thickness of the PVA thin film becomes larger (the concentration of the PVA based water solution becomes higher), the temperature-dependence on the white level becomes lower.

EXAMPLE 4

Each nylon based high polymer film was stacked on a SiO obliquely vapor-deposited film in the same manner as described in Example 1. Concretely, four kinds of nylon based high polymer based water solutions were prepared by diluting a nylon based high polymer (Elvamide 8061, sold by Du Pont Kabushiki Kaisha) with methanol as a solvent at four kinds of concentrations (0.15 wt %, 1 wt %, 5 wt %, and 10 wt %). Each nylon high polymer based water solution was applied on the SiO obliquely vapor-deposited film by spin-coating using a spinner in a condition of (500 rpm×4 sec+3,500 rpm×10 sec). After spin-coating, the glass substrate on which the water solution was applied on the SiO obliquely vapor-deposited film was burned in a clean oven at 110° C. for 60 min, to remove the solvent, thus forming the nylon based high polymer based film on the SiO obliquely vapor-deposited film.

For comparison, only methanol (having been used for the solvent in the above) was applied on the SiO obliquely vapor-deposited film by spin-coating, followed by burning in the same manner as described above, to prepare a sample with no stacked film.

Two pieces of the glass substrates thus processed were assembled into an empty liquid crystal cell using spacers each having a diameter of 1.6 μm and an ultraviolet curing type adhesive in such a manner that the vapor-depositing directions of the SiO obliquely vapor-deposited films formed on both the substrates are not parallel to each other. A ferroelectric liquid crystal (CS-1025 sold by Chisso Corporation) was poured in a gap between both the substrates of the cell, to thus obtain a liquid crystal display element composed of only one pixel.

With respect to the sample liquid crystal display elements thus prepared, the temperature-dependence on the threshold voltage value was first examined. A drive voltage having the waveform shown in FIG. 5 was applied to the sample element under crossed-Nicols, and the intensity of transmission light was monitored.

For the sample element with the SiO orientation film stacked with nylon at the concentration of 10 wt %, the orientation of the liquid crystal was disturbed, failing to measure the temperature-dependence on the threshold voltage value. The reason for this may be considered to be due to the fact that the irregularities of the SiO oblique pillars be flattened by the thick nylon film. The result of measuring the temperature-dependence on the threshold voltage value for each sample element is shown in FIG. 23, and a relationship between the threshold voltage value and each concentration of the nylon based water solution measured at each temperature is shown in FIG. 24.

Figure 23:
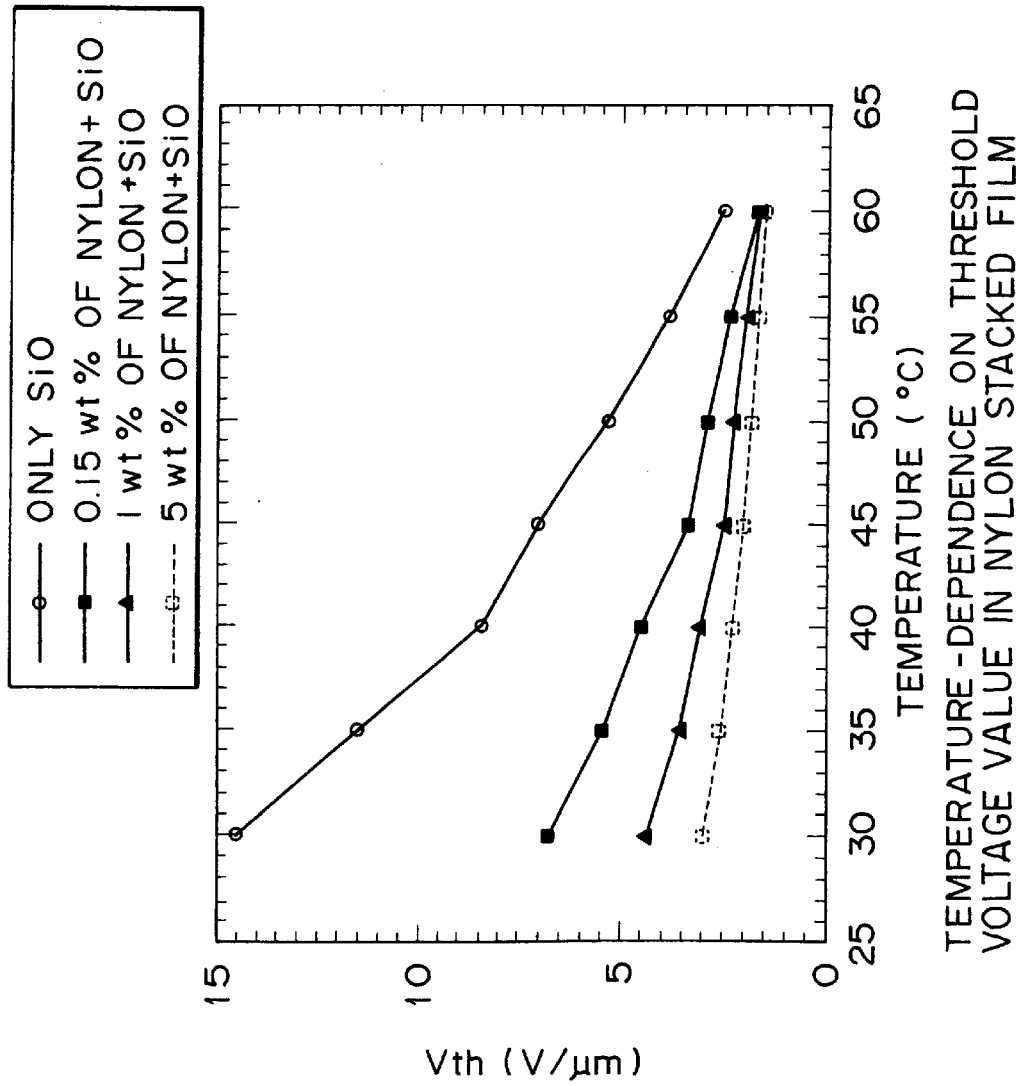
FIG. 23 is a graph showing the temperature-dependence on the threshold voltage value in each orientation film of a ferroelectric liquid crystal display element in Example 4.

As shown in FIG. 23, in each sample element with the SiO orientation film stacked with nylon, the temperature-dependence on the threshold voltage value was made smaller than that of the sample element with only the SiO orientation film. To be more specific, for the sample element with only the SiO orientation film, the threshold voltage value was 3.1 V/(40–50° C.); for the sample element with the SiO orientation film stacked with nylon at the concentration of 0.15 wt %, the threshold voltage value was 1.52 V/(40–50° C.); for the sample element with the SiO orientation film stacked with nylon at the concentration of 1 wt %, the threshold voltage value was 0.8 V/(40–50° C.); and for the sample element with the SiO orientation film stacked with nylon at the concentration of 5 wt %, the threshold voltage value was 0.5 V/(40–50° C.).

Figure 24:
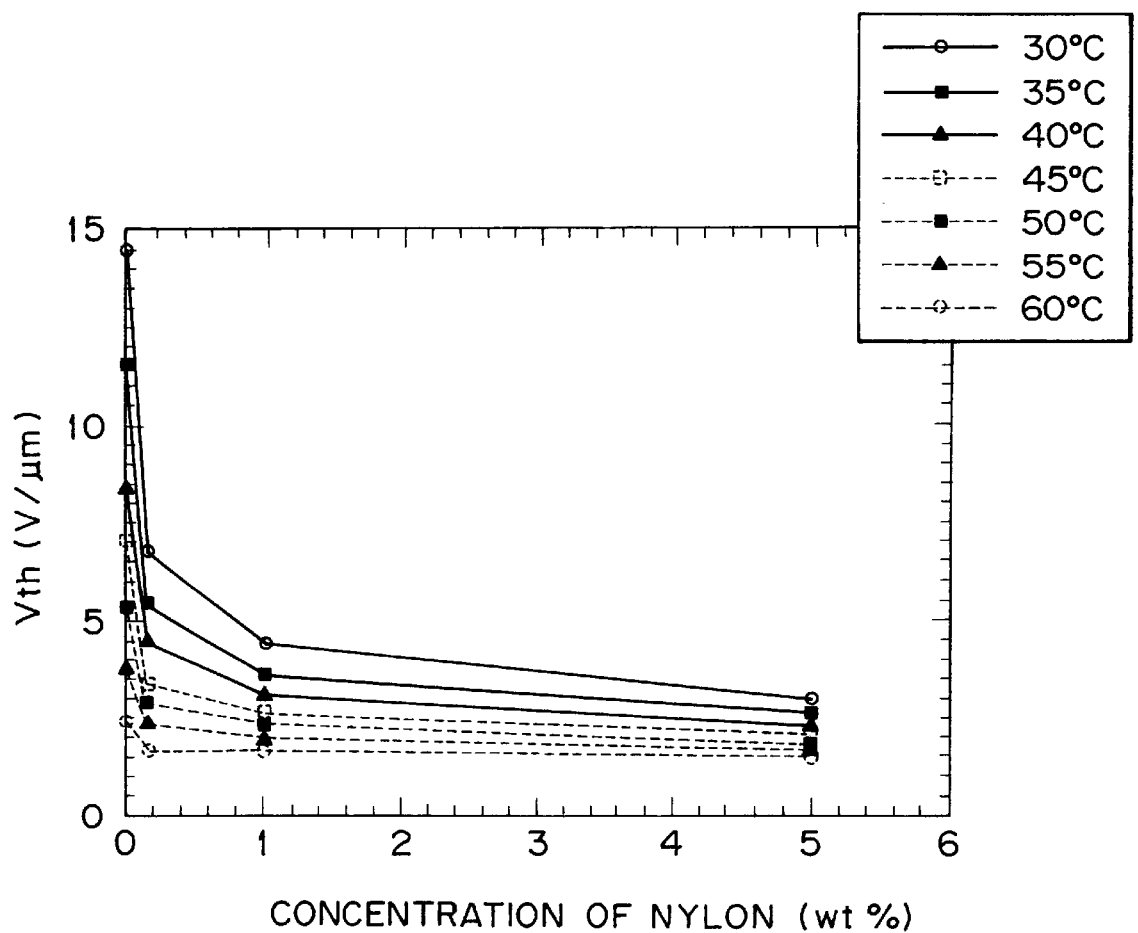
FIG. 24 is a graph showing a change in threshold voltage value depending on the concentration of nylon upon formation of an orientation film for each measurement temperature.

As shown in FIG. 24, in the sample element with the SiO orientation film stacked with nylon at the concentration of 0.15 wt % (1 wt %, 5 wt %), the threshold voltage value, for example measured at 40° C., was reduced to 53.3% (36.6%, 27.2%) of that of the sample element with only the SiO orientation film, respectively.

According to the above examples, it was found that it is possible to reduce the threshold voltage value, hysteresis phenomenon, and temperature-dependence on transmittance while keeping the good orientation characteristic by allowing the orientation of liquid crystal molecules to be performed by the SiO orientation film and allowing the interaction at the interface between the liquid crystal and orientation film to occur between the liquid crystal and the polyvinyl alcohol thin film or nylon thin film.

The above-described examples of the present invention may be variously modified without departing the technical thought of the present invention.

For example, the polyvinyl alcohol thin film may be made from not only non-saponificated polyvinyl alcohol but also partially saponificated polyvinyl alcohol. Also, even if a nylon based thin film containing nylon is formed on a $SiO_x$ obliquely vapor-deposited film in place of the polyvinyl alcohol based thin film, the same effect as that obtained for the polyvinyl alcohol based thin film can be obtained.

The material and structure of the above orientation film may be variously changed without departing from the purpose of the present invention, and the drive type may be any one of a segment type, simple matrix type and active matrix type.

As the ferroelectric liquid crystal usable for the present invention, there may be used a liquid crystal obtained by mixing a chiral compound and a non-chiral compound. However, only one kind or a plurality of kinds selected from the group consisting from chiral compounds and non-chiral compounds may be used.

Specific examples of chiral compounds may include the known pyrimidine, biphenyl, and phenyl benzoate based compound (each of these ferroelectric liquid crystals sometimes exhibits a chiral nematic phase or smectic phase depending on a change in temperature). Specific examples of non-chiral compounds may include the known biphenyl, terphenyl, tricycle cyclohexyl, cyclohexyl, biphenyl cyclohexane, cyclohexyl ethane, ester, pyrimidine, pyridazine, ethane, and dioxane based compounds.

The known antiferroelectric liquid crystal may be used in place of the above-described ferroelectric liquid crystal. Further, if the hysteresis is not taken into account, the present invention can be applied to nematic liquid crystals (twisted nematic liquid crystal, super twisted nematic liquid crystal, and in-plane type twisted liquid crystal) In this case, it is expected to obtain the same effect as that described above.

With respect to the structural members of the liquid crystal, the kind and combination of the liquid crystals used may be selected from the above-described liquid crystals. Also, a transparent glass substrate may be used as the substrate, and ITO or aluminum may be used for the electrode layer. As the transparent electrode, tin oxide or indium oxide used for the known electrode may be used, in addition to the ITO. In the case of using the reflection type liquid crystal element, a material having a high reflectance such as aluminum or silver may be used as a reflection film. Further, the components of the liquid crystal element such as a transparent substrate, spacer, sealing material may be made from the known materials.

The above-described element may be used for not only the light modulator but also a light shutter, a light switch, and a light blinder. Further, the combination of the above-described element with an electrooptic element can be applied to a liquid crystal prism, liquid crystal lens, optical path switch, display, phase diffraction grating, A/D converter, and optical logic circuit.

What is claimed is:

1. A liquid crystal element comprising:
    a plurality of bases each having a liquid crystal orientation film, wherein the surface sides, on which said liquid crystal orientation films are formed, of the adjacent two pieces of said bases are opposed to each other with a specific gap put therebetween and a liquid crystal is arranged in said gap;
    wherein said liquid crystal orientation film comprises:
        a $SiO_x$ obliquely vapor-deposited film (x: positive number less than 2); and
        a polyvinyl alcohol based and/or nylon based thin film stacked on said obliquely vapor-deposited film to a thickness of 0.1 μm or less allowed to keep irregularities of oblique pillars of said obliquely vapor-deposited film.

2. A liquid crystal element according to claim 1, wherein said polyvinyl alcohol based thin film is made from partially saponificated or non-saponificated polyvinyl alcohol having the polymerization degree of 20,000 or less.

3. A liquid crystal element according to claim 1, wherein said liquid crystal is a ferroelectric liquid crystal.

4. A liquid crystal element according to claim 1, wherein said liquid crystal element is used for a liquid crystal display element, a liquid crystal light modulator or a liquid crystal light modulation type display element.

5. A method of manufacturing a liquid crystal element which includes a plurality of bases each having a liquid crystal orientation film, wherein the surface sides, on which the liquid crystal orientation films are formed, of the adjacent two pieces of the bases are opposed to each other with a specific gap put therebetween and a liquid crystal is arranged in the gap, said method comprising the steps of:

forming a $SiO_x$ obliquely vapor-deposited film (x: positive number less than 2) on one surface of each of said bases;

coating said obliquely vapor-deposited film with a polyvinyl alcohol based water solution having a concentration of 1 wt % or less and/or a nylon based alcohol solution having a concentration of 5 wt % or less in such a manner as to keep irregularities of oblique pillars of the obliquely vapor-deposited film, and drying the water solution or alcohol solution, thereby forming a polyvinyl alcohol based and/or nylon based thin film on said obliquely vapor-deposited film.

6. A method of manufacturing a liquid crystal element according to claim 5, wherein the polyvinyl alcohol based and/or nylon based thin film is formed to a thickness of 0.1 $\mu$m or less.

7. A method of manufacturing a liquid crystal element according to claim 5, wherein the polyvinyl alcohol based thin film is made from partially saponificated or non-saponificated polyvinyl alcohol having a polarization degree of 20,000 or less.

8. A method of manufacturing a liquid crystal element according to claim 5, wherein said liquid crystal is a ferroelectric liquid crystal.

* * * * *